US010187904B2

(12) United States Patent
Van Loon et al.

(10) Patent No.: US 10,187,904 B2
(45) Date of Patent: *Jan. 22, 2019

(54) TELECOMMUNICATIONS NETWORK AND METHOD FOR TIME-BASED NETWORK ACCESS

(71) Applicant: Koninklijke KPN N.V., The Hague (NL)

(72) Inventors: Johannes Maria Van Loon, Zoetermeer (NL); Michael Robert Schenk, The Hague (NL)

(73) Assignee: Koninklijke KPN N.V., Rotterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,500

(22) Filed: Feb. 29, 2016

(65) Prior Publication Data
US 2016/0183298 A1    Jun. 23, 2016

Related U.S. Application Data

(63) Continuation of application No. 14/297,767, filed on Jun. 6, 2014, now Pat. No. 9,781,743, which is a (Continued)

(30) Foreign Application Priority Data

Feb. 29, 2008    (EP) .................................. 080003753

(51) Int. Cl.
*H04W 4/00* (2018.01)
*H04M 3/38* (2006.01)
(Continued)

(52) U.S. Cl.
CPC ............. *H04W 74/04* (2013.01); *H04M 3/38* (2013.01); *H04W 4/50* (2018.02); *H04W 4/70* (2018.02);
(Continued)

(58) Field of Classification Search
CPC ............. H04W 74/0875; H04W 74/08; H04W 74/004; H04W 74/04; H04W 48/08;
(Continued)

(56) References Cited

U.S. PATENT DOCUMENTS 3,439,331 A    4/1969  Brown
3,925,611 A   12/1975  Dennis
(Continued)

FOREIGN PATENT DOCUMENTS

CN    101106417 A    1/2008
DE       4118993 A1   12/1992
(Continued)

OTHER PUBLICATIONS

Office Action in U.S. Appl. No. 12/919,965 dated May 15, 2012.
(Continued)

*Primary Examiner* — Khawar Iqbal
(74) *Attorney, Agent, or Firm* — McDonnell Boehnen Hulbert & Berghoff LLP

(57) ABSTRACT

The invention relates to a telecommunications network configured for providing access to a plurality of terminals is proposed and a method therefore. Each terminal comprises a unique identifier for accessing the telecommunications network. The telecommunications network comprises a register, an access request receiver and an access module. The register is configured for storing the unique identifier of at least one terminal in combination with at least one grant access time interval, or an equivalent thereof, during which access for the terminal is permitted. The access request receiver is configured for receiving the access request and the unique identifier for accessing the telecommunications network from the terminal. The access module is configured for denying access for the terminal if the access request is received outside the time interval, or the equivalent thereof.

8 Claims, 6 Drawing Sheets

Related U.S. Application Data continuation of application No. 12/919,965, filed as application No. PCT/EP2009/001214 on Feb. 19, 2009, now Pat. No. 9,014,667.

(51) Int. Cl.

| | | |
|---|---|---|
| *H04W 74/04* | (2009.01) | |
| *H04W 4/70* | (2018.01) | |
| *H04W 4/50* | (2018.01) | |
| *H04W 76/11* | (2018.01) | |
| *H04W 28/02* | (2009.01) | |
| *H04W 48/08* | (2009.01) | |
| *H04W 74/00* | (2009.01) | |
| *H04W 8/26* | (2009.01) | |
| *H04W 60/00* | (2009.01) | |
| *H04W 12/06* | (2009.01) | |

(52) U.S. Cl.
CPC ....... *H04W 28/0247* (2013.01); *H04W 48/08* (2013.01); *H04W 74/002* (2013.01); *H04W 76/11* (2018.02); *H04W 8/26* (2013.01); *H04W 12/06* (2013.01); *H04W 60/00* (2013.01); *H04W 74/00* (2013.01)

(58) Field of Classification Search
CPC ... H04W 48/00; H04W 12/06; H04W 76/046; H04W 52/0229; H04W 28/08; H04W 4/00; G06F 21/31; G06F 21/34; H04L 67/18; H04L 63/102; G06Q 30/04; H04M 3/38; H04Q 7/20
USPC .................. 455/411, 423, 435.1, 453.2, 454
See application file for complete search history.

(56) References Cited

U.S. PATENT DOCUMENTS

| | | | |
|---|---|---|---|
| 3,958,081 A | 5/1976 | Ehrsam | |
| 4,004,089 A | 1/1977 | Richard | |
| 4,255,811 A | 3/1981 | Adler | |
| 4,394,642 A | 7/1983 | Currie | |
| 4,434,323 A | 2/1984 | Levine | |
| 4,547,887 A | 10/1985 | Mui | |
| 4,596,898 A | 6/1986 | Pemmaraju | |
| 4,639,548 A | 1/1987 | Oshima | |
| 4,718,067 A | 1/1988 | Peters | |
| 4,723,246 A | 2/1988 | Weldon | |
| 4,782,490 A | 11/1988 | Tenengolts | |
| 4,916,702 A | 4/1990 | Berlekamp | |
| 5,001,753 A | 3/1991 | David | |
| 5,003,596 A | 3/1991 | Wood | |
| 5,042,033 A | 8/1991 | Costa | |
| 5,063,533 A | 11/1991 | Erhart | |
| 5,111,463 A | 5/1992 | Zook | |
| 5,146,324 A | 9/1992 | Miller | |
| 5,159,452 A | 10/1992 | Kinoshita | |
| 5,230,003 A | 7/1993 | Dent | |
| 5,263,030 A | 11/1993 | Rotker | |
| 5,267,248 A | 11/1993 | Reyner | |
| 5,289,501 A | 2/1994 | Seshardri | |
| 5,345,451 A | 9/1994 | Uriu | |
| 5,353,352 A | 10/1994 | Dent | |
| 5,371,534 A | 12/1994 | Dagdeviren | |
| 5,374,958 A | 12/1994 | Yanagihara | |
| 5,392,299 A | 2/1995 | Rhines | |
| 5,410,600 A | 4/1995 | Toy | |
| 5,422,894 A | 6/1995 | Abe | |
| 5,432,848 A | 7/1995 | Butter | |
| 5,434,395 A | 7/1995 | Storck | |
| 5,434,673 A | 7/1995 | Inoue | |
| 5,438,571 A | 8/1995 | Albrecht | |
| 5,446,747 A | 8/1995 | Berrou | |
| 5,463,641 A | 10/1995 | Dorward | |
| 5,465,260 A | 11/1995 | Zook | |
| 5,483,541 A | 1/1996 | Linsky | |
| 5,493,609 A | 2/1996 | Winseck | |
| 5,511,096 A | 4/1996 | Huang | |
| 5,524,256 A | 6/1996 | Turkowski | |
| 5,530,232 A | 6/1996 | Taylor | |
| 5,535,227 A | 7/1996 | Silvano | |
| 5,548,648 A | 8/1996 | Yorke-Smith | |
| 5,563,882 A | 10/1996 | Bruno | |
| 5,581,708 A | 12/1996 | Iijima | |
| 5,592,404 A | 1/1997 | Zook | |
| 5,596,604 A | 1/1997 | Cioffi | |
| 5,619,576 A | 4/1997 | Shaw | |
| 5,635,703 A | 6/1997 | Tanaka | |
| 5,644,305 A | 7/1997 | Inoue | |
| 5,664,007 A | 9/1997 | Samadi | |
| 5,671,275 A | 9/1997 | Ezuriko | |
| 5,721,745 A | 2/1998 | Hladki | |
| 5,727,004 A | 3/1998 | Propp | |
| 5,729,560 A | 3/1998 | Hagenauer | |
| 5,734,787 A | 3/1998 | Yonemitsu | |
| 5,745,507 A | 4/1998 | Chen | |
| 5,764,278 A | 6/1998 | Nagao | |
| 5,764,736 A | 6/1998 | Shachar | |
| 5,809,209 A | 9/1998 | Hoshi | |
| 5,819,176 A | 10/1998 | Rast | |
| 5,835,601 A | 11/1998 | Shimbo | |
| 5,844,218 A | 12/1998 | Kawan | |
| 5,859,838 A | 1/1999 | Soliman | |
| 5,872,798 A | 2/1999 | Baggen | |
| 5,898,710 A | 4/1999 | Amrani | |
| 5,901,303 A | 5/1999 | Chew | |
| 5,909,239 A | 6/1999 | Lee | |
| 5,916,302 A | 6/1999 | Dunn | |
| 5,963,980 A | 10/1999 | Coulier | |
| 5,991,857 A | 11/1999 | Koetje | |
| 5,999,526 A | 12/1999 | Garland et al. | |
| 6,011,976 A | 6/2000 | Michaels | |
| 6,081,534 A | 6/2000 | Sipila | |
| 6,112,101 A | 8/2000 | Bhatia | |
| 6,148,072 A | 11/2000 | Huang | |
| 6,163,692 A | 12/2000 | Chakrabarti | |
| 6,178,336 B1 | 1/2001 | Crozat | |
| 6,212,372 B1 | 4/2001 | Julin | |
| 6,275,695 B1 | 8/2001 | Obhan | |
| 6,281,925 B1 | 8/2001 | Kosaka | |
| 6,456,859 B1 | 9/2002 | Desblancs | |
| 6,501,956 B1 | 12/2002 | Weeren | |
| 6,600,726 B1 | 7/2003 | Nevo | |
| 6,608,637 B1 | 8/2003 | Beaton | |
| 6,674,897 B1 | 1/2004 | Sugisaki | |
| 6,774,927 B1 | 8/2004 | Cohen | |
| 6,775,247 B1 | 8/2004 | Shaffer | |
| 6,813,496 B2 | 11/2004 | Numminen et al. | |
| 6,865,237 B1 | 3/2005 | Boariu | |
| 6,898,248 B1 | 5/2005 | Elgamal | |
| 6,922,568 B1 | 7/2005 | Nakamura | |
| 7,003,569 B2 | 2/2006 | Garg | |
| 7,007,087 B1 * | 2/2006 | Souma ................. | G06F 9/5083 370/230 |
| 7,027,417 B1 | 4/2006 | Verkama | |
| 7,075,890 B2 | 7/2006 | Ozer et al. | |
| 7,123,936 B1 | 10/2006 | Rydbeck | |
| 7,231,360 B2 | 6/2007 | Sy | |
| 7,236,791 B2 * | 6/2007 | Chambers ............. | H04W 72/10 455/450 |
| 7,301,893 B2 | 11/2007 | Onggosanusi | |
| 7,313,593 B1 | 12/2007 | Pulito | |
| 7,447,774 B2 | 11/2008 | Viswanath et al. | |
| 7,505,755 B2 | 3/2009 | Taniguchi et al. | |
| 7,519,354 B2 | 4/2009 | Lee et al. | |
| 7,693,506 B1 * | 4/2010 | Back .................... | H04W 60/00 455/432.1 |
| 7,774,008 B2 | 8/2010 | Benaouda et al. | |
| 7,821,935 B2 | 10/2010 | Park et al. | |
| 7,995,538 B2 | 8/2011 | Patrick et al. | |
| 8,005,037 B2 | 8/2011 | Ishii et al. | |
| 8,028,327 B1 | 9/2011 | Talley et al. | |
| 8,064,882 B2 | 11/2011 | Shatzkamer et al. | |
| 8,112,083 B1 | 2/2012 | Sigg et al. | |

(56) References Cited

U.S. PATENT DOCUMENTS

| | | | |
|---|---|---|---|
| 8,131,318 B2 | 3/2012 | Montes | |
| 8,189,460 B2 | 5/2012 | Shaffer et al. | |
| 8,213,953 B1 | 7/2012 | Mangal | |
| 8,380,169 B2 | 2/2013 | Gogic | |
| 8,787,166 B2* | 7/2014 | Takano | H04W 28/06 |
| | | | 370/231 |
| 9,055,511 B2 | 6/2015 | Gupta et al. | |
| 9,380,045 B2* | 6/2016 | Gilboy | H04L 63/08 |
| 9,655,006 B2 | 5/2017 | Zhu | |
| 2002/0055350 A1 | 5/2002 | Gupte | |
| 2002/0086679 A1 | 7/2002 | Li et al. | |
| 2002/0154210 A1 | 10/2002 | Ludwig | |
| 2002/0162008 A1* | 10/2002 | Hill | G06F 21/31 |
| | | | 726/26 |
| 2002/0180614 A1 | 12/2002 | Gonzalez et al. | |
| 2002/0181501 A1 | 12/2002 | Nova et al. | |
| 2003/0027580 A1 | 2/2003 | Goodjohn et al. | |
| 2003/0043928 A1 | 3/2003 | Ling | |
| 2003/0156700 A1 | 8/2003 | Brown et al. | |
| 2004/0013180 A1 | 1/2004 | Giannakis | |
| 2004/0088394 A1 | 5/2004 | Brinton et al. | |
| 2004/0147266 A1 | 7/2004 | Hwang et al. | |
| 2004/0162070 A1 | 8/2004 | Baral et al. | |
| 2004/0219934 A1 | 11/2004 | Lee | |
| 2004/0259528 A1 | 12/2004 | Gandhi et al. | |
| 2005/0122233 A1 | 6/2005 | Isoyama et al. | |
| 2005/0192001 A1 | 9/2005 | Samuel | |
| 2006/0015354 A1 | 1/2006 | Shrum, Jr. et al. | |
| 2006/0171350 A1* | 8/2006 | Taniguchi | H04L 12/1417 |
| | | | 370/328 |
| 2006/0221926 A1 | 10/2006 | Maekawa | |
| 2006/0268838 A1 | 11/2006 | Larsson | |
| 2006/0293046 A1* | 12/2006 | Smith | G06Q 10/06 |
| | | | 455/423 |
| 2006/0294387 A1 | 12/2006 | McCracken et al. | |
| 2007/0111790 A1 | 5/2007 | Maekawa | |
| 2007/0142031 A1 | 6/2007 | Lee et al. | |
| 2007/0157292 A1 | 7/2007 | Danner et al. | |
| 2007/0169107 A1 | 7/2007 | Huttunen | |
| 2007/0183427 A1 | 8/2007 | Nylander | |
| 2007/0195789 A1 | 8/2007 | Yao | |
| 2007/0207812 A1 | 9/2007 | Borran et al. | |
| 2007/0248060 A1 | 10/2007 | Mooney et al. | |
| 2007/0268908 A1 | 11/2007 | Linkola et al. | |
| 2007/0271598 A1 | 11/2007 | Chen et al. | |
| 2008/0066125 A1 | 3/2008 | Li et al. | |
| 2008/0075032 A1 | 3/2008 | Balachandran et al. | |
| 2008/0132207 A1 | 6/2008 | Gallagher et al. | |
| 2008/0162707 A1 | 7/2008 | Beck et al. | |
| 2008/0207178 A1 | 8/2008 | Tischer et al. | |
| 2008/0220740 A1* | 9/2008 | Shatzkamer | H04L 63/101 |
| | | | 455/411 |
| 2008/0293429 A1* | 11/2008 | Harris | H04L 47/11 |
| | | | 455/453 |
| 2009/0005053 A1* | 1/2009 | Agin | H04L 47/10 |
| | | | 455/450 |
| 2009/0141661 A1 | 6/2009 | Li et al. | |
| 2009/0191857 A1 | 7/2009 | Horn et al. | |
| 2009/0191858 A1 | 7/2009 | Calisti et al. | |
| 2010/0014423 A1 | 1/2010 | Furuskar et al. | |
| 2010/0031334 A1 | 2/2010 | Shaikh | |
| 2010/0128681 A1 | 5/2010 | Breuer et al. | |
| 2010/0177663 A1 | 7/2010 | Johansson et al. | |
| 2011/0312308 A1 | 12/2011 | Willey | |
| 2013/0279617 A1 | 10/2013 | Xu et al. | |
| 2013/0304881 A1 | 11/2013 | Venkatraman et al. | |
| 2014/0207511 A1* | 7/2014 | Klausmeier | G06Q 10/109 |
| | | | 705/7.19 |
| 2014/0317178 A1* | 10/2014 | Purpura | H04L 63/10 |
| | | | 709/203 |
| 2016/0277402 A1* | 9/2016 | Gilboy | H04L 63/08 |
| 2017/0118702 A1* | 4/2017 | Di Girolamo | H04J 11/0093 |
| 2017/0201609 A1* | 7/2017 | Salmenkaita | H04M 1/72561 |

FOREIGN PATENT DOCUMENTS

| | | |
|---|---|---|
| DE | 19511031 C2 | 6/2000 |
| EP | 0402759 B1 | 12/1990 |
| EP | 0467534 A2 | 1/1992 |
| EP | 0511141 A | 10/1992 |
| EP | 0641137 A2 | 3/1995 |
| EP | 0743622 A2 | 11/1996 |
| EP | 0748135 A2 | 12/1996 |
| EP | 0788287 | 8/1997 |
| EP | 0748135 B1 | 10/1998 |
| EP | 1009176 A2 | 6/2000 |
| EP | 1032236 A1 | 8/2000 |
| EP | 0786915 B1 | 12/2004 |
| EP | 0743622 B1 | 5/2006 |
| EP | 1681815 A1 | 7/2006 |
| EP | 0583006 B2 | 11/2006 |
| EP | 0876736 B1 | 10/2012 |
| GB | 2160392 A | 12/1985 |
| GB | 2280085 A | 1/1995 |
| JP | H05-344211 A | 12/1993 |
| JP | H7-154745 | 6/1995 |
| JP | H10-117243 A | 5/1998 |
| JP | H11-055176 A | 2/1999 |
| JP | 2004-072367 A | 3/2004 |
| WO | 91/12698 A1 | 8/1991 |
| WO | 92/19078 A1 | 10/1992 |
| WO | 95/07010 A1 | 3/1995 |
| WO | 95/24698 A1 | 9/1995 |
| WO | 96/04759 A2 | 2/1996 |
| WO | 96/34503 A1 | 10/1996 |
| WO | 97/30561 | 8/1997 |
| WO | WO1999/07167 | 2/1999 |
| WO | 01/03461 A1 | 1/2001 |
| WO | WO2001/55861 | 8/2001 |
| WO | 01/65876 A1 | 9/2001 |
| WO | WO2003/028310 | 4/2003 |
| WO | WO2005031544 A2 | 4/2005 |
| WO | WO2005048529 A1 | 5/2005 |
| WO | WO2007127092 A2 | 11/2007 |

OTHER PUBLICATIONS

Office Action in U.S. Appl. No. 12/919,965 dated Feb. 13, 2013.

PCT International Search Report and Written Opinion, PCT International Application No. PCT/EP2009/001214, dated Mar. 23, 2009.

Digital Cellular Telecommunications System (Phase 2+): Universal Mobile Telecommunications System (UMTS); Technical Realization of Operator Determined Barring (ODB) (3GPP TS 23.015 version 7.0.0 Release 7), ETSI TS 123 015, ETSI Standards, Lis, Sophia Antipolis cedex, France, vol. 3-CN2; 3-CN4, No. V7.0.0, Mar. 1, 2007.

European Search Report, European Patent Application No. 08003753.4 dated Aug. 19, 2008.

3rd Generation Partnership Project; Technical Specification Group Services and System Aspects; Study on Facilitating Machine to Machine Communication in 3GPP System; (Release 8), 3GPP Standard; 3GPP TR 22.868, 3rd Generation Partnership Project (3GPP), Mobile Competence Centre; 650, Route Des Lucioles; F-06921 Sophia-Antipolis Cedex; France, No. V8.0.0, Mar. 1, 2007.

ETSI TS 125 331 V5.21.0 (Jan. 2008); Technical Specification; "Universal Mobile Telecommunications System (UMTS); Radio Resource Control (RRC); Protocol Specification (3GPP TS 125.331 version 5.21.0 Release 5)" Jan. 2008.

"Improved Network Load Control for CELL/URA_PCH States", 3GPP TSG-RAN WG2 Meeting #57bis, St. Julian's, Malta, Mar. 26-30, 2007.

Office Action in U.S. Appl. No. 12/919,965 dated Jul. 9, 2014.

Japanese Office Action in Japanese Patent Application No. 2013-095150, dated Mar. 27, 2014.

Japanese Office Action in Japanese Patent Application No. 2013-130181, dated Apr. 23, 2014.

"Telecommunications Network", Encyclopaedia Britannica. Encyclopaedia Britannica Online. Encyclopaedia Britannica Inc., 2014,

(56) References Cited

OTHER PUBLICATIONS

Web. Sep. 30, 2014 <http://www.britannica.com/EBchecked/topic/585829/telecommunications-network>, 1 page.
GEO-Mobile Radio Interface Specifications (Release 2) General Packet Radio Service; Part 4: Radio interface protocol specifications; Sub-part 8: Mobile Radio Interface Layer 3 Specifications; GMPRS-1 04.008; ETSI TS 101 376-4-8 V2.3.1, Aug. 2008, 134 pages.
GEO-Mobile Radio Interface Specifications (Release 2) General Packet Radio Service; Part 3: Network specifications; Sub-part 3: Numbering, addressing and identification; GMPRS-1 03.003; ETSI TS 101 376-03-03 V2.1.1, Mar. 2003, 17 pages.
GEO-Mobile Radio Interface Specifications (Release 2) General Packet Radio Service; Part 4: Radio interface protocol specifications; Sub-part 12: Mobile Earth Station (MES)—Base Station System (BSS) interface; Radio Link Control/Medium Access Control (RLC/MAC) protocol; GMPRS-1 04.060; ETSI TS 101 376-4-12 V2.1.1, Mar. 2003, 94 pages.
Dimitrios Miras, Network QoS Needs of Advanced Internet Applications, 2002, available at http://comp.ist.utl.pt/pdeec-qs/bibliografia/10-Internet2AppsQoSNeeds.pdf.
3GPP TS 22.368 V0.3.0: "Service requirements for Machine-Type Communications (MTC); Stage 1", Feb. 2009.
3GPP TS 23.060 V7.6.0: "3rd Generation Partnership Project; Technical Specification Group Services and System Aspects; General Packet Radio Service (GPRS); Service description; Stage 2 (Release 7)", Dec. 2007.
3GPP TS 23.015 V7.0.0: "Digital cellular telecommunications system (Phase 2+); Universal Mobile Telecommunications System (UMTS); Technical realization of Operator Determined Barring (ODB) (Release 7)", Mar. 2007.
Proceedings of Conference on NASA Centers for Commercial Development of Space, AIP SCITATION, http://scitation.aip.org/content/aip/proceeding/aipcp/325 (as of May 12, 2016) (descriptions of proceedings expanded).
Michel Mouly, and Marie-Bernadette Pautet, "The GSM system for mobile communications" (excerpts) 1992, ISBN 2-9507190-0-7.
"Mobile Radio Interface Layer 3 Specification (Release 92, Phase 1)" ETSI Recommendation GSM 04.08 v3.13.0 (Feb. 1992), ETSI prI-ETS 300 022 (Feb. 1992).
*3G Licensing S.A. Koninklijke KPN N.V. and Orange S.A.* v. *Blackberry Limited and Blackberry Corporation et al.*, Docket No. C.A. No. 17-82 (LPS) et al., "Defendants' Initial Invalidity Contentions With Respect to U.S. Pat. Nos. 3,014,667; 7,993,564; 7,995,091 and 6,856,818", Feb. 2, 2018, 47 pages.
3rd Generation Partnership Project (3GPP), "3GPP 3G TR 23.972 V3.0.0 (Mar. 2000)—3rd Generation Partnership Project; Technical Specification Group CN; Circuit Switched Multimedia Telephony" (Release 1999), Mar. 2000, pp. 1-17.
3rd Generation Partnership Project (3GPP), "3GPP N1-99637—TSNG Working Group 1 Tdoc N1-99637, In-Call Modification Procedure; H.324M Transport Efficiency", Jun. 29-Jul. 1, 1999, 5 pages.
3GPP TSG RAN WG1 #49 Meeting R1-072277, "Downlink Interference Coordination", May 7-11, 2007, 5 pages.
3rd Generation Partnership Project (3GPP), "3GPP SA3 Feasibility Study on Remote Management of USIM Application on M2M Equipment", ETSI Workshop on Machine to Machine Standardization, Jun. 4-5, 2008—ETSI, Sophia Antipolis, France, pp. 1-16.
3rd Generation Partnership Project (3GPP), "3GPP TR 22.868 v0.3.0 (Feb. 2006)—3rd Generation Partnership Project; Technical Specification Group Services and System Aspects; Study on Facilitating Machine to Machine Communication in 3GPP Systems; Release 7", Feb. 2006, pp. 1-11.
3rd Generation Partnership Project (3GPP), "3GPP TR 33.812 V0.2.2 (Mar. 2008)—3rd Generation Partnership Project; Technical Specification Group Services and System Aspects; Feasibility Study on Remote Management of USIM Application on M2M Equipment; Release 8", Mar. 2008, pp. 1-48.

3rd Generation Partnership Project (3GPP), "3GPP TS 22.041 V7.0.0 (Mar. 2007)—3rd Generation Partnership Project; Technical Specification Group Services and System Aspects; Operator Determined Barring (ODB) (Release 7)", Mar. 2007, pp. 1-10.
3rd Generation Partnership Project (3GPP), "3GPP TS 23.107 V7.1.0 (Sep. 2007)—3rd Generation Partnership Project; Technical Specification Group Services and System Aspects; Quality of Service (QoS) Concept and Architecture (Release 7)", Sep. 2007, pp. 1-40.
3rd Generation Partnership Project (3GPP), "3GPP TS 23.207 V7.0.0 (Jun. 2007)—3rd Generation Partnership Project; Technical Specification Group Services and System Aspects; End-to-End Quality of Service (QoS) Concept and Architecture (Release 7)", Jun. 2007, pp. 1-40.
3rd Generation Partnership Project (3GPP), "3GPP TS 25.331 V5.21.0 (Dec. 2007)—Release 5", Dec. 2007, pp. 1-1046.
3rd Generation Partnership Project (3GPP), "3GPP TSG #38, CP-070878—Review of the Work Plan at Plenaries #38", Nov. 27-Dec. 6, 2007, 40 pages.
3rd Generation Partnership Project (3GPP), "3GPP TSG SA WG3 Security—S3#48, S3-070xxx—Comments to S3-070576, Downloadable USIM Application on M2M Terminals", Jul. 10-13, 2007, 3 pages.
3rd Generation Partnership Project (3GPP), "3GPP TSG SA WG3 Security—S3#50, S3-080164—Enhanced Roles Description", Feb. 25-29, 2008, 3 pages.
3rd Generation Partnership Project (3GPP), "3GPP TSG SA WG3 Security—SA3#49, S3-070726—Concept of Initial USIM Application Installation in the M2M Equipment", Oct. 8-12, 2007, 5 pages.
3rd Generation Partnership Project (3GPP), "3GPP TSG SA WG3 Security—SA3#50, S3-080104—An M2M Architecture Alternative Separating Connectivity Services and Remote Application", Feb. 25-29, 2008, 10 pages.
3rd Generation Partnership Project (3GPP), "3GPP TSG SA WG3 Security #50, S3-080015—changes to TR33.812, v0.1.0, Network Architecture Alternative 1, Section", Feb. 25-29, 2008, 5 pages.
3rd Generation Partnership Project (3GPP), 3GPP TSG SA WG3 Security—S3#50, S3-080163—Architecture Modifications and Alternatives for Remote Management of USIM Application on M2M Equipment, Feb. 25-29, 2008, 6 pages.
3rd Generation Partnership Project (3GPP), "3GPP TSG-SA WG1 #33 Ad Hoc S1-061074 Agenda Item: 7.1—Report of SWG Machine to Machine Communication (M2M)", Aug. 28-Sep. 1, 2006, 4 pages.
3rd Generation Partnership Project (3GPP)/European Telecommunication Standard (ETSI), "ETSI TS 101 349 V6.14.0 (Jul. 2002)—Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol", 3GPP TS 04.60 Version 6.14.0 Release 1997, Jul. 2002, 223 pages.
3rd Generation Partnership Project (3GPP)/European Telecommunication Standard (ETSI), "ETSI TS 101 349 V8.27.0 (Sep. 2005)—Digital Cellular Telecommunications System (Phase 2+); General Packet Radio Service (GPRS); Mobile Station (MS)—Base Station System (BSS) interface; Radio Link Control/ Medium Access Control (RLC/MAC) Protocol", 3GPP TS 04.60 Version 8.27.0 Release 1999, Sep. 2005, 302 pages.
3rd Generation Partnership Project (3GPP)/European Telecommunication Standard (ETSI), "ETSI TS 123 002 V4.8.0 (Jun. 2003)—Digital Cellular Telecommunications System (Phase 2+); Universal Mobile Telecommunications System (UMTS); Network architecture", 3GPP TS 23.002 Version 4.8.0 Release 4, Jun. 2003, 41 pages.
3rd Generation Partnership Project (3GPP)/European Telecommunication Standard (ETSI), "ETSI TS 144 018 V4.23.0 (May 2006)—Digital Cellular Telecommunications System (Phase 2+); Mobile Radio Interface Layer 3 Specification; Radio Resource Control (RRC) Protocol", 3GPP TS 44.018 Version 4.23.0 Release 4, May 2006, 328 pages.
3rd Generation Partnership Project (3GPP)/Ericsson, "3GPP TSG SA WG3 Security—SA3#50, S3-080174—Addressing Raised Concerns to TR 33.812, Also Reflecting Against S3-080104", Feb. 25-29, 2008, 24 pages.

(56) References Cited

OTHER PUBLICATIONS

3rd Generation Partnership Project (3GPP)/Swentina, J. NEC, 3GPP's Initial Thoughts on Machine to Machine Communication, Powerpoint Presentation, Jun. 2008, 14 pages.

European Telecommunication Standard (ETSI), "ETSI Draft prETS 300 581-2, GSM 06.20 version 4.0.0—European Digital Cellular Telecommunications System; Half Rate Speech—Part 2: Half Rate Speech Transcoding (GSM 06.20)", Aug. 1995, pp. 1-50.

European Telecommunication Standard (ETSI), "ETSI Draft prETS 300 608 (GSM 11.11v4.18.1)—Digital Cellular Telecommunications System (Phase 2); Specification of the Subscriber Identity Module—Mobile Equipment (SIM-ME) Interface", Dec. 1996, pp. 1-88.

European Telecommunication Standard (ETSI), "ETSI Draft prETS 300 923 (GSM 02.24 v5.0.0)—Digital Cellular Telecommunications System; Description of Charge Advice Information (CAI)" Nov. 1996, pp. 1-15.

European Telecommunication Standard (ETSI), "ETSI ETS 300 906 (GSM 02.07 v5.2.1)—Digital Cellular Telecommunications System (Phase 2+); Mobile Stations (MS) Features", Apr. 1997, pp. 1-21.

European Telecommunication Standard (ETSI), "ETSI ETS 300 921 (GSM 02.11 v5.0.1)—Digital Cellular Telecommunications System; Service Accessibility", Apr. 1997, pp. 1-14.

European Telecommunication Standard (ETSI), "ETSI ETS 300 922 (GSM 02.17 v5.0.1)—Digital Cellular Telecommunications System; Subscriber Identity Modules (SIM); Functional Characteristics", Apr. 1997, pp. 1-14.

European Telecommunication Standard (ETSI), "ETSI Final draft prETS 300 581-2, GSM 06.20 v4.2.0—European Telecommunication Standard, European Digital Cellular Telecommunications System; Half Rate Speech—Part 2: Half Rate Speech Transcoding (GSM 06.20)", Aug. 1995, pp. 1-50.

European Telecommunication Standard (ETSI), "ETSI GSM 02.03 v.5.1.0—Digital Cellular Telecommunications System (Phase 2+); Teleservices Supported by a GSM Public Land Mobile Network PLMN", Jul. 1996, pp. 1-24.

European Telecommunication Standard (ETSI), "ETSI GSM 02.07 v.5.1.0—Digital Cellular Telecommunications System (Phase 2+); Mobile Stations (MS) Features", Jul. 1996, pp. 1-20.

European Telecommunication Standard (ETSI), "ETSI GSM 03.03 v5.0.0—Digital Cellular Telecommunications System (Phase 2+); Numbering, Addressing and Identification (GSM 03.03 v. 5.0.0)", Mar. 1996, pp. 1-22.

European Telecommunication Standard (ETSI), "ETSI GSM 03.03 v6.1.0—Digital Cellular Telecommunications System (Phase 2+); Numbering, Addressing and Identification (GSM 03.03 version 6.1.0 Release 1997)" TS 100 927 V6.1.0, Jul. 1998, pp. 1-23.

European Telecommunication Standard (ETSI), "ETSI GSM 05.03 v5.0.0—Digital Cellular Telecommunications System (Phase 2+); Channel Coding (GSM 05.03)", Mar. 1996, pp. 1-31.

European Telecommunication Standard (ETSI), "ETSI GSM 05.03 v5.1.0—Digital Cellular Telecommunications System (Phase 2+); Channel Coding (GSM 05.03)", (May 1996), pp. 1-31.

European Telecommunication Standard (ETSI), "ETSI GSM 11.11-DCS v3.3.3-1—Release Note Recommendation—Specifications of the SIM-ME Interface", Jul. 1993, 15 pages.

European Telecommunication Standard (ETSI), ETSI TC-SMG ETS 300 509, European Digital Cellular Telecommunications System (Phase 2); Subscriber Identity Modules (SIM) Functional Characteristics (GSM 02.17), Sep. 1994, pp. 1-15.

European Telecommunication Standard (ETSI), "ETSI TC-SMG ETS 300_522 (GSM 03.02 v4.2.1)", Nov. 1996, pp. 1-19.

European Telecommunication Standard (ETSI), "ETSI TC-SMG GSM 02.07 v5.2.0—Digital Cellular Telecommunications System (Phase 2+); Mobile Stations (MS) Features (GSM 02.07)", Nov. 1996, pp. 1-21.

European Telecommunication Standard (ETSI), "ETSI TC-SMG GSM 11.11, Digital Cellular Telecommunications System (Phase 2+); Specification of the Subscriber Identity Module—Mobile Equipment (SIM—ME) Interface; (GSM 11.11)", Jul. 1996, pp. 1-113.

European Telecommunication Standard (ETSI), ETSI TdocSMG: 56/96—Stage 1 of Personalization of the GSM ME and CR to GSM 02.07 for SIM/ME Association, ETSI TC SMG Meeting #17, Edinburgh, Jan. 29-Feb. 2, 1996, 25 pages.

European Telecommunication Standard (ETSI), "ETSI TdocSMG1: 286/96—Liaison Statement to ETSI SMG on GSM/MSS Interworking", May 1996, 5 pages.

European Telecommunication Standard (ETSI), "ETSI TdocSMG1: 74/96 (GSM 02.97, v1.1.0)—European Digital Cellular Telecommunications (Phase 2+); Multiple Subscriber Profile (MSP) Service Description, Stage 1 (GSM 02.97, v1.1.0)", Feb. 1996, 12 pages.

European Telecommunication Standard (ETSI), "ETSI Technical Report ETR 174 (GSM 09.91 v4.0.1)—European Digital Cellular Telecommunications System (Phase 2); Interworking Aspects of the Subscriber Identity Module—Mobile Equipment (SIM- ME) Interface Between Phase 1 and Phase 2 (GSM 09.91)", Apr. 1995, pp. 1-13.

European Telecommunication Standard (ETSI), "ETSI TS 101 038 V7.0.0 (Aug. 1999), Digital cellular Telecommunications System (Phase 2+); High Speed Circuit Switched Data (HSCSD)—Stage 2 (GSM 03.34 Version 7.0.0 Release 1998)", Aug. 1999, pp. 1-20.

European Telecommunication Standard (ETSI), "ETSI, Draft prETS 300 977 (GSM 11.11 v5.4.0)—Digital Cellular Telecommunications System (Phase 2+); Specification of the Subscriber Identity Module—Mobile Equipment (SIM-ME) Interface", Dec. 1996, pp. 1-118.

'Exhibit B-1 to Defendants' Preliminary Invalidity Contentions Invalidity of U.S. Pat. No. 9,014,667 ("The '667 Patent" Over U.S. Pat. No. 6,275,695 to Obhan ("Obhan"), *3G Licensing S.A. Koninklijke KPN N.V. and Orange S.A. v. Blackberry Limited and Blackberry Corporation*, Docket No. C.A. No. 17-82 (LPS) et al., 39 pages.

Nodera, Y. et al., "Interworking Between GSM and PDC Through IC cards," IEEE International Conference on Communications, ICC '95 Seattle, 'Gateway to Globalization', Seattle, WA, 1995, vol. 2., pp. 761-765.

Pearson, P.K., Fast Hashing of Variable-Length Text Strings. Commun. ACM vol. 33, No. 6, Jun. 1990, pp. 677-680.

Rahnema, M., "Overview of the GSM System and Protocol Architecture," IEEE Communications Magazine, vol. 31, No. 4, Apr. 1993, pp. 92-100.

Ramabadran, T.V. et al., "Tutorial on CRC Computations," IEEE Micro vol. 8 No. 4, Aug. 1988, pp. 62-74.

Robertson, P., "Illuminating the Structure of Code & Decoder of Paralell Concatenated Recursive Systematic (Turbo) Codes," 1994 IEEE GLOBECOM, vol. 3, Communications: The Global Bridge, San Francisco, CA, 1994, pp. 1298-1303.

Robertson, P., "Improving Decoder and Code Structure of Parallel Concatenated Recursive Systematic (Turbo) Codes," Proceedings of 1994 3rd IEEE International Conference on Universal Personal Communications, San Diego, CA, 1994, pp. 183-187.

Ross, M., et al., "Performance Analysis of Hybrid Switching Concepts for Integrated Voice/Data Communications," IEEE Transactions on Communications, vol. 30, No. 5, May 1982, pp. 1073-1087.

Ruiz, I.B. et al., "On the Design of a Self-Managed Wireless Sensor Network," IEEE Communications Magazine, vol. 13, No. 8, Jul. 2005, pp. 95-102.

Seneviratne, A. et al., "Quality of Service Management for Distributed Multimedia Applications," Proceeding of 13th IEEE Annual International Phoenix Conference on Computers and Communications, 1994, pp. 434-439.

Shiokawa, S. et al., "Bandwidth Allocation for Wireless ATM Considering Priorities of Component Calls," Global Telecommunications Conference, 1999. GLOBECOM '99, Rio de Janeireo, 1999, vol. 1a., pp. 227-233.

Shiu, D., et al., "Layered Space-Time Codes for Wireless Communications Using Multiple Transmit Antennas," IEEE International Conference on Communications, vol. 1, Vancouver, BC (1999), pp. 436-440.

(56) References Cited

OTHER PUBLICATIONS

Shu, L. et al., "Sharing Worldwide Sensor Network," 2008 International Symposium on Applications and the Internet, Turku, 2008, pp. 189-192.
Svirid, Y., "Additive Upper Bounds for Turbo-Codes with Perfect Interleaving," Coding Theory, Information Theory and Cryptology: Proceedings of the EIDMA Winter Meeting, Veldhoven; van Tilberog, H.C.A.; Willems, F.M.J., Dec. 19-21, 1994, p. 35.
Thom, G.A., "H323: The Multimedia Communications Standard for Local Area Networks," IEEE Communications Magazine, vol. 34, No. 12, Dec. 1996, pp. 52-56.
Tsetsos, V. et al.. "Commercial Wireless Sensor Networks: Technical and Business Issues," Second Annual Conference on Wireless On-demand Network Systems and Services, 2005, pp. 166-173.
Varshney, D. et al., "Space-Time Codes in Wireless Communications", IEEE Potentials, vol. 22, Issue: 3, Aug.-Sep. 2003, pp. 36-38.
Viterbi, A.J., "Convolution Codes and Their Performance in Communication Systems," IEEE Transactions on Communications Technology, vol. COM-19, No. 5, Oct. 1971, pp. 751-772.
Watson, D.S. et al., "Machine to Machine (M2M) Technology in Demand Responsive Commercial Buildings," Published in the Proceedings from the ACEEE 2004 Summer Study on Energy Efficiency in Buildings: Breaking out of the Box, Aug. 22-27, 2004, 17 pages.
Wicker, S.B., "High-Reliability Data Transfer Over the Land Mobile Radio Channel Using Interleaved Hybrid-ARQ Error Control," IEEE Transactions on Vehicular Technology, vol. 39, No. 1, Feb. 1990, pp. 48-55.
Wizgali, M., "PCS Implementation-A Merger of American and European Mobile Systems," Proceedings of 3rd IEEE International Conference on Universal Personal Communications, San Diego, CA (1994), pp. 612-618.
Wolf, J.K., "Permutation Codes, (d,k) Codes and Magnetic Recording," Proceedings of the 1990 IEEE Colloquium in South America, Argentina, Brazil, Chile, 1990, pp. 59-61.
Wu, X. et al., "Efficient Channel Borrowing Strategy for Real-Time Services in Multimedia Wireless Networks," IEEE Transactions on Vehicular Technology, vol. 49, No. 4, Jul. 2000, pp. 1273-1284.
Yamaguchi, A. et al., "Interoperability of PDC with GSM," 4th IEEE International Conference on Universal Personal Communications, Tokyo, Japan, 1995, pp. 452-456.
Ye, W. et al., "Medium Access Control with Coordinated Adaptive Sleeping for Wireless Sensor Networks," IEEE/ACM Transactions on Networking, vol. 12, No. 3, Jun. 2004, pp. 493-506.
Zehavi, E. et al., "The PCS CDMA System Overview", Universal Personal Communications, 1994 Third Annual International Conference on Sep. 27-Oct. 1, 1994, pp. 83-88.
Clark, G.C. et al., "Error-Correction Coding for Digital Communications, Plenum Press (1981)," Ch. 8: System Applications, pp. 331-392.
Vucetic, B. et al., "Turbo Codes: Principles and Applications, Ch. 4: Turbo Coding Performance Analysis and Code Design," Kluwer Academic Publishers, 2000, pp. 73-115.
Wicker, S.B., "Error Control Systems for Digital Communication & Storage, Ch. 1: Error Control Coding for Digital Communications Systems", Prentice Hall (1995), pp. 1-19 & Ch.16: Applications, pp. 424-443.
Comatlas, SA, CAS 5093 Turbo-Code Codec, Comatlas Data Sheet, REV 4.0, Sep. 1994, 8 pages.
Duraiappap, C., "Security Issues in Mobile Communications," Thesis Submitted to University of Wollongong, 1994,145 pages.
Höckenström, K., "Wide Area Tiny Tags (WATT): Opportunities and Technology challenges," Master's Thesis at the School of Media Technology Royal Institute of Technology, 2006, 116 pages.
Machine2Machine Solutions by Opto 22, "M2M and the Supply Chain; The Power and Potential of M2M in the Supply chain: A Network of Manufacturing and Distribution Facilities and Processes" Machine2Machine Opto22, White Paper, 2003-2004, pp. 1-7.
Monrad, A., "Modules for Machine-to-Machine Communications in GPRS: Case Study, Medical Surveillance," Thesis Submitted to Agder University College, May 2001, pp. 1-55.
Morgenstern, R.M., "Vector Quantization Applied to Speech Coding in the Wireless Environment," Thesis Submitted to Virginia Polytechnic Institute & State University, Jul. 11, 1994, 177 pages.
Orange Business Services, "Machine to Machine Stakes and Prospects," Orange Business Services White Paper, 2006, 36 pages.
Walter, K. M2M Alliance, "Implementing M2M Applications via GPRS, EDGE and UMTS," m2m Alliance Information Sheet, 9 pages.
Wang, J., "Study of Bandwidth Efficient DS-CDMA Systems," Thesis Submitted to the School of Graduate Studies and Research, Ottawa—Carleton Institute of Electrical Engineering, Nov. 12, 1993, 199 pages.
Federal Information Processing Standards Publication (FIPS), FIPS Publication 46-3—Data Encryption Standard (DES) (Oct. 25, 1999) 27 pages.
Federal Information Processing Standards (FIRS), FIPS Publication 46-2—Data Encryption Standard (DES) (Dec. 30, 1993) 15 pages.
IEEE, IEEE Std. 802.11-2007 (revision of IEEE Std. 802.Nov. 1999), 1184 pages.
Telecommunications Industry Association (TIA), IS-54-B (Revision of IS/54-A), "EIA/TIA Interim Standard—Cellular System Dual-Mode Mobile Station—Base Station Compatibility Standard", Apr. 1992, 302 pages.
Agnew, G. B. IEEE, "Cryptographic Systems Using Redundancy," IEEE Trans. Inf. Theor. vol. 36, No. 1, Sep. 2006, pp. 31-39.
Akyildiz, I. F. et al., "A Survey on Sensor Networks," IEEE Communications Magazine, vol. 40, No. 8, Aug. 2002, pp. 102-114.
Anderson, S. "GSM-interoperable Mobile Satellite Call Processing Architecture," Proceedings of the Second European Workshop on Mobile/Personal Satcoms (EMPS 96) Mobile and Personal Satellite Communications, 1996, pp. 247-269.
Andrews, K.S. et al., "The Development of Turbo and LDPC Codes for Deep-Space Applications," Proceedings of the IEEE, vol. 95, No. 11, Nov. 2007, pp. 2142-2156.
Arnbak, J., "The European (R)evolution Wireless Digital Networks," IEEE Communications Magazine, vol. 31, No. 9, Sep. 1993, pp. 74-82.
Barbulescu, A. S., et al., "Interleaver Design for Turbo Codes," Electronics Letters, vol. 30, No. 25, Dec. 8, 1994, pp. 2107-2108.
Barbulescu, A. S., et al., "Rate Compatible Turbo Codes," Electronics Letters, vol. 31, No. 7, Mar. 30, 1995, pp. 535-536.
Berrou, C. et al., "Near Shannon Limit Error-Correction Coding and Decoding Turbo Codes," IEEE International Conference on Communications (ICC'93), vol. 2, 1993, pp. 1064-1070.
Brown, C. et al., "A Reconfigurable Modem for Increased Network Capacity and Video, Voice, and Data Transmission over GSM PCS," IEEE Transactions on Circuits and Systems for Video Technology, vol. 6, No. 2, Apr. 1996, pp. 215-224.
Cam, H. et al., "Energy-Efficient Secure Pattern Based Data Aggregation for Wireless Sensor Networks," Comput. Commun., vol. 29, No. 4, Feb. 2006, pp. 446-455.
Garg, V., "Interworking and Interoperability Issues for North American PCS," IEEE Communications Magazine, vol. 34, No. 3, Mar. 1996, pp. 94-99.
Choi, S. et al., "Adaptive bandwidth reservation and admission control in QoS-sensitive cellular networks," IEEE Transactions on Parallel and Distributed Systems, vol. 13, No. 9, pp. 1-16, Sep. 2002.
Debbah, M. et al., "The Spectral Efficiency of Linear Precoders," Proceedings 2003 IEEE Information Theory Workshop, 2003, pp. 90-93.
Debbah, M. et al., "A MMSE Successive Interference Cancellation Scheme for a New Adjustable Hybrid Spread OFDM System," 51st Vehicular Technology Conference Proceedings, VTC2000-Spring, vol. 2 Tokyo, 2000, pp. 745-749.
Divsalar, D. et al., "Multiple Turbo Codes for Deep-Space Communications," TDA Progress Report 42-121, May 15, 1995, pp. 66-77.
Divsalar, D. et al., "On the Design of Turbo Codes," TDA Progress Report 42-123 (Nov. 15, 1995), pp. 99-121.

(56) References Cited

OTHER PUBLICATIONS

Divsalar, D. et al., "Turbo Codes for Deep-Space Communications," TDA Progress Report 42-120, Feb. 15, 1995, pp. 29-39.
Divsalar, D. et al., "Turbo Codes for PCS Applications," IEEE International Conference on Communications, vol. 1. 1995, pp. 54-59.
Dolinar, S. et al., "Weight Distributions for Turbo Codes Using Random and Nonrandom Permutations," TDA Progress Report 42-122, Aug. 15, 1995, pp. 56-65.
Doostneiad, R. et al., "Space-Time Spreading Codes for a Multiuser MIMO System," Conference Record of the Thirty-Sixth Asilomar Conference on Signals, Systems and Computers, vol. 2., Pacific Grove, CA, USA, (2002), pp. 1374-1378.
Gama, O. et al., "Wireless Sensor Networks with QoS for E-Health and e-Emergency Applications", Conference Paper, Proceedings of the 2nd International Workshop on E-Health Services and Technologies, Porto, Portugal, Jul. 5-8, 2008, 10 pages.
Gluhak, A. et al., "A WSN System Architecture to Capture Context Information for Beyond 3G Communication Systems," 2007 3rd International Conference on Intelligent Sensors, Sensor Networks and Information, Melbourne, Qld., 2007, pp. 49-54.
Guntsch, A., "Mobility Management in an Integrated GSM and Satellite PCN," Proceedings of Vehicular Technology conference—VTC, Atlanta, GA (1996), vol. 3. pp. 1830-1834.
Gupta, S. et al., "Design Considerations and Implementation of a Cost-Effective, Portable Remote Monitoring Unit Using 3G Wireless Data Networks," Proceedings of the 26 Annual International Conference of the IEEE EMBS (2004), pp. 3286-3289.
Gupta, S. et al., "Overview of M2M." Ankit Hirdesh Papers website: http://hriday.ankit.googlepages.com/M2M_overview_paper.pdf, 2007, 11 pages.
Hamming, R. W., "Error Detecting and Error Correcting Codes," The Bell System Technical Journal, vol. XXIX, No. 2, Apr. 1950, pp. 147-160.
Hu, F. et al., "QoS Considerations in Wireless Sensor Networks for Telemedicine", Proceedings of SPIE ITCOM Conference, Sep. 2003, 11 pages.
Hu, F. et al., "The Integration of Ad Hoc Sensor and Cellular Networks for Multi-Class Data Transmission," Ad-Hoc Networks Journal, vol. 4, No. 2, Mar. 2006, pp. 254-282.
Jamil, M. et al., "4G: The Future Mobile Technology," TENCON 2008—2008 IEEE Region 10 Conference, Hyderabad, 2008, pp. 1-6.
Jung, P., "Novel Low Complexity Decoder for Turbo-Codes," Electronics Letters, vol. 31, No. 2, Jan. 19, 1995. pp. 86-87.
Jung, P. et al., "Dependence of the Error Performance of Turbo-Codes on the Interleaver Structure in Short Frame Transmission Systems," Electronics Letters, vol. 30, No. 4, Feb. 17, 1994, pp. 287-288.
Kim, S. et al., "Adaptive Load Balancing with Preemption for Multimedia Cellular Networks," 2003 IEEE Wireless Communications and Networking, WCNC 2003., New Orleans, LA, USA, 2003, vol. 3, pp. 1680-1684.
Kim, Tae-soo et al., "Integrated Number Portability Protocols for Wire and Wireless Network," 1998 Int'l Conference on Communication Technology Proceedings (ICCT '98), Beijing, 1998, pp. S24-06-1-S24-06-5.
Knuutila, J. et al., "Data Possibilities of DECT/GSM Dual mode Terminals," 7th IEEE Int'l Symposium on Personal, Indoor and Mobile Radio Communications,PIMRC'96., Taipei (1996), vol. 2 pp. 683-687.
Krco, S. et al., "Mobile Network Supported Wireless Sensor Network Services," IEEE International Conference on Mobile Adhoc and Sensor Systems, Pisa, 2007, pp. 1-3.
Krisfinamurthy, S. et al., "Automation of Facility Management Processes Using Machine-to-Machine Technologies", The Internet of Things, Springer, Berlin, Heidelberg, 2008, 18 pages.

Kuhn, M. et al., "Linear Scalable Space-Time Codes: Tradeoff Between Spatial Multiplexing and Transmit Diversity," 4th IEEE Workshop on Signal Processing Advances in Wireless Communications—SPAWC 2003, pp. 1-5.
Lantto, J., "Towards a Global Cellular Service," 4th IEEE International Conference on Universal Personal Communications, Tokyo (1995), pp. 457-461.
LE Goff, S. et al.,"Turbo-Codes and High Spectral Efficiency Modulation," Communications, ICC '94, SUPERCOMM/ICC '94, Conference Record, 'Serving Humanity Through Communications.' IEEE International Conference on, New Orleans, LA, vol. 2 (1994), pp. 645-649.
Lee, H. et al., "Performance Analysis of Statistical Voice/Data Multiplexing Systems with Voice Storage," IEEE Transactions on Communications, vol. 33, No. 8, pp. 809-819, Aug. 1985.
Lindbergh, D., "The H.324 Multimedia Communication Standard," IEEE Communications Magazine, vol. 34, No. 12, Dec. 1996, pp. 46-51.
Luby, M.G et al., "Practical Loss-Resilient Codes," STOC '97 Proceedings of the Twenty-Ninth Annual ACM Symposium on Theory of Computing, El Paso, TX, May 4-6, 1997, pp. 150-159.
Luke D. "Large Family of Cubic Phase Sequences with Low Correlation," Electronics Letters, vol. 31, No. 3, Feb. 2, 1995, pp. 163-165.
Magnusson, P. et al., "Radio Resource Management Distribution in a Beyond 3G Multi-Radio Access Architecture," Global Telecommunications Conference, 2004. GLOBECOM '04. IEEE, 2004, vol. 6, pp. 3472-3477.
Malkemes, R. et al., "An Interoperable PACS and DCS1900 Subscriber Unit Radio Architecture," Proceedings of 6th International Symposium on Personal, Indoor and Mobile Radio Communications, Toronto, Ont., Canada, 1995, pp. 1149-1154.
Maric, S.V., "Class of Algebraically Constructed Permutations for Use in Pseudorandom Interleavers," Electronics Letters, vol. 30, No. 17, Aug. 18, 1994, pp. 1378-1379.
Martsola, M. et al., "Machine to Machine Communication in Cellular Networks" Mobile Technology, Applications and Systems, 2005 2nd International Conference, (2005), 6 pages.
McAuley, A.J., "Weighted Sum Codes for Error Detection and Their Comparison with Existing Codes," IEEE/ACM Transactions on Networking, vol. 2, No. 1, Feb. 1994, pp. 16-22.
Munir, S. A. et al., "Mobile Wireless Sensor Network: Architecture and Enabling Technologies for Ubiquitous Computing," Advanced Information Networking and Applications Workshops, AINAW '07. 21st International Conference on, Niagara Falls, Ont., 2007, pp. 113-120.
Nikolos, D., et al.. "Systematic t-Error Correcting All Unidirectional Error Detecting Codes," Großpietsch KE., Dal Cin M. (eds) Fehlertolerierende Rechensysteme. Informatik-Fachberichte, vol. 84 (1984), pp. 177-188.
"Exhibit B-2 to Defendants' Preliminary Invalidity Contentions Invalidity of U.S. Pat. No. 9,014,667 ("The '667 Patent") Over U.S. Pat. No. 7,505,755 to Taniguchi et al. ("Taniguchi")", *3G Licensing S.A. Koninklijke KPN N.V. and Orange S.A. v. Blackberry Limited and Blackberry Corporation*, Docket No. C.A. No. 17-82 (LPS) et al., 17 pages.
"Exhibit B-3 to Defendants' Preliminary Invalidity Contentions Invalidity of U.S. Pat. No. 9,014,667 ("The '667 Patent") Over U.S. Pat. No. 7,007,087 to Souma et al. ("Souma")", *3G Licensing S.A. Koninklijke KPN N.V. and Orange S.A. v. Blackberry Limited and Blackberry Corporation*, Docket No. C.A. No. 17-82 (LPS) et al., 23 pages.
"Exhibit B-4 to Defendants' Preliminary Invalidity Contentions Invalidity of U.S. Pat. No. 9,014,667 ("The '667 Patent") Over U.S. 3GPP/GSM Prior Art Networks ("3GPP/GSM")", *3G Licensing S.A. Koninklijke KPN N.V. and Orange S.A. v. Blackberry Limited and Blackberry Corporation*, Docket No. C.A. No. 17-82 (LPS) et al., 32 pages.
"Annex 1—Patent References", *3G Licensing S.A. Koninklijke KPN N.V. and Orange S.A. v. Blackberry Limited and Blackberry Corporation*, Docket No. C.A. No. 17-82 (LPS) et al., pp. 1-4.

(56) References Cited

OTHER PUBLICATIONS

"Annex 2—Publication References", *3G Licensing S.A. Koninklijke KPN N.V. and Orange S.A.* v. *Blackberry Limited and Blackberry Corporation*, Docket No. C.A. No. 17-82 (LPS) et al., pp. 1-19.
ETSI TS 123 060 V7.6.0 (Jan. 2008)—Digital Cellular Telecommunications System (Phase 2+); Universal Mobile Telecommunications System (UMTS); General Packet Radio Service (GPRS); Service description; Stage 2 (3GPP TS 23.060 version 7.6.0 Release 7), 219 pages.
ETSI TC-SMG Draft prI-ETS 300 022-1 "Digital Cellular Telecommunications System (Phase 1); Mobile Radio Interface Layer 3 Specification Part 1: Generic (GSM 04.08 version 3.14.0)", Sep. 1997, 450 pages.
European Telecommunications Standard, 323 ETSI GSM 02.22 v5.1.0—Siemens Change Request to GSM 02.22. May 1996, 14 pages.
European Telecommunications Standard, ETSI TdocSMG1: 156/96—Liaison Statement on Additional SIM Security Features (rev Tdoc SMG-SG 088/96), Mar. 1996, 4 pages.
European Telecommunications Standard, ETSI TdocSMG1: 248/96—Proposal Liaison Statement Consideration of SIM Impacts from MSP, Apr. 1996, 2 pages.
European Telecommunications Standard, ETSI TdocSMG1: 279/96—Liaison Statement—SIM Impacts on MSP, Jul. 1996, 2 pages.
European Telecommunications Standard, ETSI TdocSMG1: 313/96—Draft Liaison to SMG6—New Phase 2+ GSM Services, Aug. 1996, 6 pages.
European Telecommunications Standard, ETSI TdocSMG1: 325/96—Interaction of SPNP with MSP, Aug. 1996, 4 pages.
European Telecommunications Standard, ETSI TdocSMG1: 389/96 The Selection of MSP Profiles, Aug. 1996, 6 pages.
European Telecommunications Standard, ETSI TdocSMG1: 390/96—Interaction between MSP and Supplementary Services, Aug. 1996, 8 pages.
European Telecommunications Standard, ETSI TdocSMG1: 449/96 Clarification of MO and MT activities in MSP, Nov. 1996, 4 pages.
European Telecommunications Standard, ETSI TdocSMG1: 472/96—Phase 2+ Work Item Description Sheet, Nov. 1996, 6 pages.
European Telecommunications Standard, ETSI TdocSMG3: 97B031—Provision of Supplementary Services in MSP, Nov. 1996, 4 pages.
European Telecommunications Standard, ETSI TdocSMG3: 97B041—Proposed Liaison to SMG1 on the SMG1/SMG3 WPB Concerning the MSP Supplementary Service, Feb. 1997, 1 page.
European Telecommunications Standard, ETSI TdocSMG3: 97B045—Proposed Liaison to SMG1 on the SMG1/SMG3 WPB Concerning the MSP Supplementary Service, Feb. 1997, 1 page.
3GPP TS 23.060 version 7.0.0, 3rd Generation Partnership Project; Technical Specification Group Services and System Aspects; General Packet Radio Service (GPRS); Service Description; Stage 2 (Release 7), Mar. 2006, pp. 1-212.
Camarillo, G. et al., "Chapter 3—General Principles of the IMS Architecture", The 3G IP Multimedia Subsystem (IMS), Merging the Internet and the Cellular Words, Second Edition, copyright John Wiley & Sons, Ltd., 2006, 28 pages.
GSM Technical Specification No. 04.08 version 5.0.0, "Digital Cellular Telecommunications System (Phase 2+); Mobile Radio Interface Layer 3 Specification (GSM 04.08)", Dec. 1995, p. 1-531.
ETSI EN 301 344 V7.2.0, Digital Cellular Telecommunications System (Phase 2+); General Packet Radio Service (GPRS); Service Description; Stage 2 (GSM 3.60 version 7.200 Release 1998), Nov. 1999, pp. 1-119.
*Koninklijke KPN N.V.,* v *Samsung Electronics Co. Ltd.*, Lead Case No. 2:14-CV-1165-JRG Eastern District, Texas, "Claim Construction Memorandum and Order", May 6, 2016, pp. 1-79.
3GPP TS 23.015 version 7.0.0, 3rd Generation Partnership Project; Technical Specification Group Core Network; Technical Realization of Operator Determined Barring (ODB), Release 7, Mar. 2007, pp. 1-26.
Bates, Regis J. Bud, GPRS General Packet Radio Service, McGraw Hill, 399 pages.

In Re U.S. Pat. No. 9,014,667, "Telecommunications Network and Method for Time-Based Network Access", Declaration of Craig Bishop, Feb. 1, 2018, pp. 1-76.
In Re U.S. Pat. No. 9,014,667, "Telecommunications Network and Method for Time-Based Network Access", Petition for Inter Partes Review of U.S. Pat. No. 9,014,667, Feb. 1, 2018, 74 pages.
Curriculum Vitae, Craig Bishop, 4 pages.
3GPP—3G TS 22.135 V.3.0.0 (Oct. 1999)—3rd Generation Partnership Project; Technical Specification Group Services and System Aspects; Multicall; Service Description; Stage 1, pp. 1-16.
3G TR ab.cde V0.0.2 (Oct. 1999)—3rd Generation Partnership Project; Technical Specification Group CN; Multimedia Telephone (3G TR ab.cde version 0.0.2), pp. 1-15.
3GPP TSG-CN-WG1, Report of the 3GPP TSG-N WG1 MM/CC/SM (UI) / Meeting #8, Oct. 25-29, 1999, Kobe, Japan, 83 pages.
3GPP Technical Specification Group, Service Aspects Working Group 1, Working Group 2, Core Network Working Group 1, Working Group 2 and Supplementary Services ad-hoc Group, Joint Meeting Oulu, Jun. 29-Jul. 1, 1999, 18 pages.
TSG—Report of SA Meeting #5, V.1.0.0—Kjongju, South Korea, Oct. 11-13, 1999, pp. 1-83.
Alabbadi, Mohssen et al., "Combined Data Encryption and Reliability Using McEliece's Public-Key Cryptosystem", International Symposium on Information Theory & Its Applications, Sydney, Australia, Nov. 20-24, 1994, pp. 263-268.
Paskin, Norman, Digital Object Identifier (DOI) System, Encyclopedia of Library and Information Sciences, Third Edition, Taylor & Francis, 2010, pp. 1-17.
Risher, Carol A. et al., "The Digital Object Identifier—An Electronic Publishing Tool for the Entire Information Community", Serials Review, vol. 24, Issues 3-4, 1998, pp. 12-20.
"Announcing the Advanced Encryption Standard (AES)", Federal Information Processing Standards Publication 197 (FIPS-197),Nov. 26, 2001, 51 pages.
Barbulescu, A.S., et al., "Terminating the Trellis of Turbo-Codes in the Same State", Electronics Letters, vol. 31, No. 1, Jan. 5, 1995, pp. 22-23.
Lin, S. et al., "Coding for Reliable Digital Transmission and Storage", Error Control Coding: Fundamentals and Applications, Pretice Hall Computer Applications in Electrical Engineering Series, Chapter One, Sections 1.1-1.2, 1983, pp. 1-5.
IEEE, 1995 IEEE International Conference on Communications, Front Matter and Preface, 1995, pp. II-XXVIII.
IEEE, 1995 IEEE International Conference on Communications, Conference Author Index, 1995, 5 pages.
Global System for Mobile Communication (GSM), European Telecommunications Standards Institute (ETSI), ETSI GSM TS 03.02 V5.1.0, "Digital Cellular Telecommunications System (Phase 2+); Network Architecture (GSM 03.02)", May 1996, pp. 1-20.
Global System for Mobile Communication (GSM), European Telecommunications Standards Institute (ETSI), ETSI GSM TS 11.14 V5.1.0, "Digital Cellular Telecommunications System (Phase 2+); Specification of the SIM Application Toolkit for the Subscriber Identity Module—Mobile Equipment (SIM-ME) Interface (GSM 11.14)", Aug. 1996, pp. 1-54.
Schulzrinne, Henning, "Personal Mobility for Multimedia Services in the Internet", IDMS '96, European Workshop on Interactive Distributed Multimedia Systems and Services, Berlin, Germany, Mar. 4-6, 1996, pp. 1-18.
Dianda, Janet R. et al., "Programmable Service Platforms of Converged Voice/Data Services", Bell Labs Technical Journal, Jul.-Sep. 2000, pp. 43-58.
*Lenovo (United States) Inc.*, Petitioner v. *Koninklijke KPN N.V.*, Patent Owner, Before the Patent Trial & Appeal Board, Petition for Inter Partes Review of U.S. Pat. No. 9,014,667 Pursuant to 35 U.S.C. 311-319, 37 C.F.R. 42, Aug. 31, 2018, 75 pages.
*HTC America, Inc.*, Petitioner, v. *Koninklijke KPN N.V.*, Patent Owner, Before the Patent Trial & Appeal Board, Petition for Inter Partes Review of U.S. Pat. No. 9,014,667, Aug. 31, 2018, 76 pages.

\* cited by examiner

TELECOMMUNICATIONS NETWORK AND METHOD FOR TIME-BASED NETWORK ACCESS

CROSS REFERENCE TO RELATED APPLICATIONS

The present application is a continuation of, and claims priority to, U.S. application Ser. No. 14/297,767, filed on Jun. 6, 2014, which is a continuation of, and claims priority to, U.S. application Ser. No. 12/919,965, filed on Aug. 27, 2010, which is a national stage entry of, and claims priority to, PCT/EP2009/001214, filed on Feb. 19, 2009, which claims priority to European Patent Application EP 08003753.4, filed in the European Patent Office on Feb. 29, 2008, all four of which are hereby incorporated in their entirety herein by reference.

FIELD OF THE INVENTION

The invention relates to the field of telecommunications. In particular, the invention relates a telecommunications network and a method of permitting access to said telecommunications network.

BACKGROUND OF THE INVENTION

The past decades have seen an ever increasing demand for data capacity of telecommunications network. Telecommunications providers have adapted their networks to provide extended GSM services, like GPRS, and 3G services and are continuing to provide further services to meet the demands of their clients.

Telecommunications providers have made attempts to influence the behaviour of their clients in order to efficiently use network resources. As an example, mobile data subscriptions nowadays are usually offered using volume based billing, possibly in combination with a volume cap, thereby forcing clients to consider the amount of data to be transmitted over a network. However, the control of the client behaviour and/or terminal data transmission and, therefore, the use of the network resources is still limited.

There is a need in the art for an improved telecommunications network and method for regulating the use of network resources.

SUMMARY OF THE INVENTION

A telecommunications network configured for providing communication access to a plurality of terminals is proposed. Each terminal comprises a unique identifier for accessing the telecommunications network. The unique identifier is preferably associated with a subscription of the terminal, e.g. the identifier of a SIM (IMSI) that is available in the terminal. The telecommunications network comprises a register, an access request receiver and an access module. The register is configured for storing the unique identifier of at least one terminal in combination with at least one grant access time interval, or an equivalent thereof, during which access for the terminal is permitted. The access request receiver is configured for receiving the access request for accessing the telecommunications network from the terminal. The access request may contain the unique identifier or a temporary identifier. The access module is configured for denying access for the terminal if the access request is received outside the access time interval, or the equivalent thereof.

A register and a serving controlling entity for use in such a network are also proposed.

A computer-implemented method of controlling access to a telecommunications network is also proposed. The telecommunications network is configured for allowing access for a plurality of terminals, each terminal comprising a unique identifier for accessing the telecommunications network. The telecommunications network comprises a register configured for storing the unique identifier of at least one terminal in combination with at least one grant access time interval, or an equivalent thereof. An access request is received from the terminal for access to the telecommunications network. The access request may contain the unique identifier or a temporary identifier. In a further step, the grant access time interval for the terminal is verified, using the unique identifier. Access to the telecommunications network for said terminal is denied if the access request is received outside the time interval.

A computer program and a carrier for such a computer program comprising program code portions configured for executing the method are also proposed.

A terminal for use in the system and method is also proposed.

It should be appreciated that an equivalent of the grant access time interval includes a deny access time interval identifying a time interval during which an access request for access to the telecommunications network is to be denied.

The access request may be a circuit-switched access request, a packet-switched access request or a combined request.

The steps of accessing a telecommunications network are standardized in e.g. 3 GGP TS 23.060 (Release 7). It should be appreciated that the access to the telecommunications network can be denied at various access phases. The first phase of requesting network access typically involves a network attach procedure comprising several steps. Preferably, access to the telecommunications network is denied by denying network attach of the terminal. Denying at this phase provides for optimized saving of resources.

A further network access phase involves the establishment of a PDP context. Establishment of the PDP context may be denied. Although the preceding network attach already involved the use of network resources, prohibiting the establishment of a PDP context prevents effective use of the telecommunications network and hence saves resources. It should be noted that operator determined barring (ODB) as such for access to a telecommunications network is already described in 3GGP TS 23.015, V. 7.0.0. The barring possibility allows network operators to deny access to particular destinations for certain subscribers.

By providing the option of specifying one or more time intervals during which access to the telecommunications network is allowed for a particular terminal or group of terminals, the network operator planning and control of the use of network resources is facilitated. Denying or blocking access during time intervals can prove advantageous in various situations. In particular, some machine-to-machine (M2M) applications do not require the transfer of data to be immediate. If these applications are prevented from claiming one or more network resources during e.g. peak load hours, network resources can be saved. Such subscriptions may e.g. be offered at a lower subscription rate.

M2M applications typically involve hundreds or thousands of devices that only rarely require access to a telecommunications network. An example involves the electronic reading of e.g. electricity meters at the homes of a large customer base.

The embodiments of claims 2 and 13 provide for a suitable place in the telecommunications network for making available the combinations of terminal identifier(s) and associated time interval(s).

The embodiments of claims 3 and 14 provide for a dynamic time interval (and possibly a virtual or implicit time interval) during which access to the telecommunications network is allowed/prohibited. These embodiments contribute to the optimum use of network resources.

The embodiments of claims 4 and 15 provide for an improved use of network resources.

The embodiments of claims 5 and 16 provide for an improved use of network resources.

The embodiments of claims 6 and 17 provides the option to inform the terminal of the grant access time interval. Such information should only be transmitted to the terminal in question. Moreover, only allowing single authentication saves network resources and saves power for the terminals.

The embodiments of claims 7 and 18 ensure that the decision whether or not to allow access (either network attach or establishment of the PDP context) to the telecommunications network is embedded at a low level of the telecommunications network, e.g. at the SGSN, reducing network resource consumption. Other solutions, such as the implementation of grant access time rules in a RADIUS server, would require several network functions, mobility management and setting up a packet data protocol (PDP) context, and, thereby, unnecessarily consume network resources in case it would be determined that the terminal accessed the telecommunications network outside the grant access time interval.

The embodiments of claims 8 and 19 allow the transmission of information to the terminal. Such information may include information concerning the applicable grant access time interval. Possibly, the information may include control information for controlling terminal operation. The control information may e.g. control the terminal to log in during a time interval wherein the network load is expected to be low. An authentication procedure is preferably performed for this terminal.

The embodiments of claims 9 and 20 provide for higher level authentication, e.g. at a GGSN, during the grant access time interval.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
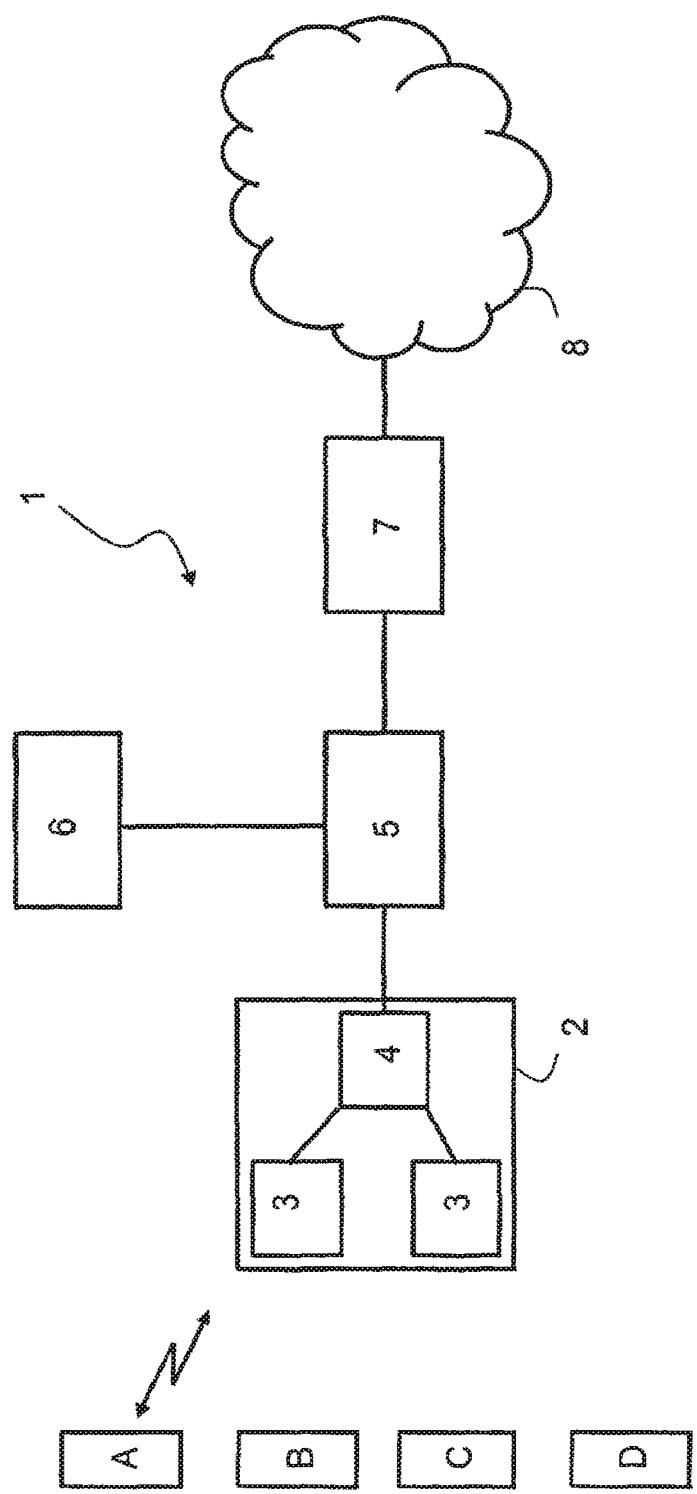
FIG. 1 shows a schematic illustration of a telecommunications network according to an embodiment of the present invention.

FIG. 1 shows a schematic illustration of a packet service telecommunications network 1 in combination with a plurality of terminals A-D that may access the telecommunications network 1 for data communication.

The telecommunications network 1 comprises a radio access network 2 containing a base transceiver station 3 and a base station controller 4. The radio access network is connected to a mobile core network containing a serving controller entity 5, a register 6 and a gateway 7 providing access to a further network 8.

The serving controller entity 5 may be a serving GPRS support node (SGSN) or another entity. The SGSN 5 controls the connection between the telecommunications network 1 and the terminals A-D. It should be appreciated that the telecommunications network may contain a plurality of SGSNs, wherein each of the SGSNs is connected typically to base station controllers 3 in such a way that they can provide a packet service for terminals via several base stations 3.

The register 6 may be a home location register (HLR) or another register (such as a home subscriber server for IMS).

The gateway 7 may be a GPRS gateway support node (GGSN) to e.g. the internet. Other external networks include a corporate network or another network of the operator. The GGSN 7 is connected to the SGSN 5 via a core network.

Access for the terminals A-D to the telecommunications network 1 involves a number of access phases.

The first phase involves the phase during which a terminal A-D performs an attach to the telecommunications network 1. In this phase, various communication steps are performed, including authentication steps, as exemplified in 3GGP TS 23.060 (Release 7). The authentication steps perform a security function and involve exchange of an authentication triplet (for GPRS) or quintet (for UMTS).

In a subsequent phase, a packet data protocol (PDP) context, may be established to carry traffic flows over the telecommunications network 1. A PDP context typically includes a radio access bearer provided between a terminal A and the SGSN 5 and switched packet data channels or tunnels provided between the SGSN 5 and the GGSN 7. A session between the terminal A and another party would then be carried on the established PDP context. A PDP context can carry more than one traffic flow, but all traffic flows within one particular PDP context are treated the same way as regards their transmission across the telecommunications network 1.

In operation, the terminal A may indicate after the network attach phase, in a message requesting to activate the PDP context in the network, an access point name (APN) for selection of a reference point to a certain external network 8. The SGSN 5 may send a PDP context creation request to the GGSN 7 selected e.g. according to the access point name given by the terminal A or to a default GGSN known by the SGSN 5. Subsequently, the PDP context is activated by allocating a PDP context data structure in the SGSN 5 that is used by the terminal A and the GGSN 7 serving the subscribers access point. The data structure contains an IP address of the terminal A, the IMSI of the terminal A and tunnel ID's at both the SGSN 5 and the GGSN 7. The tunnel ID is a number allocated by the GGSN 7 which identifies the data related to a particular PDP context.

Various features can be controlled by the SGSN 5 during a communication session. This control may be based on information associated with the subscription and stored in the HLR 6. The information may be retrieved from the HLR 6 to the SGSN 5 to allow control at the SGSN-level.

Figure 2:
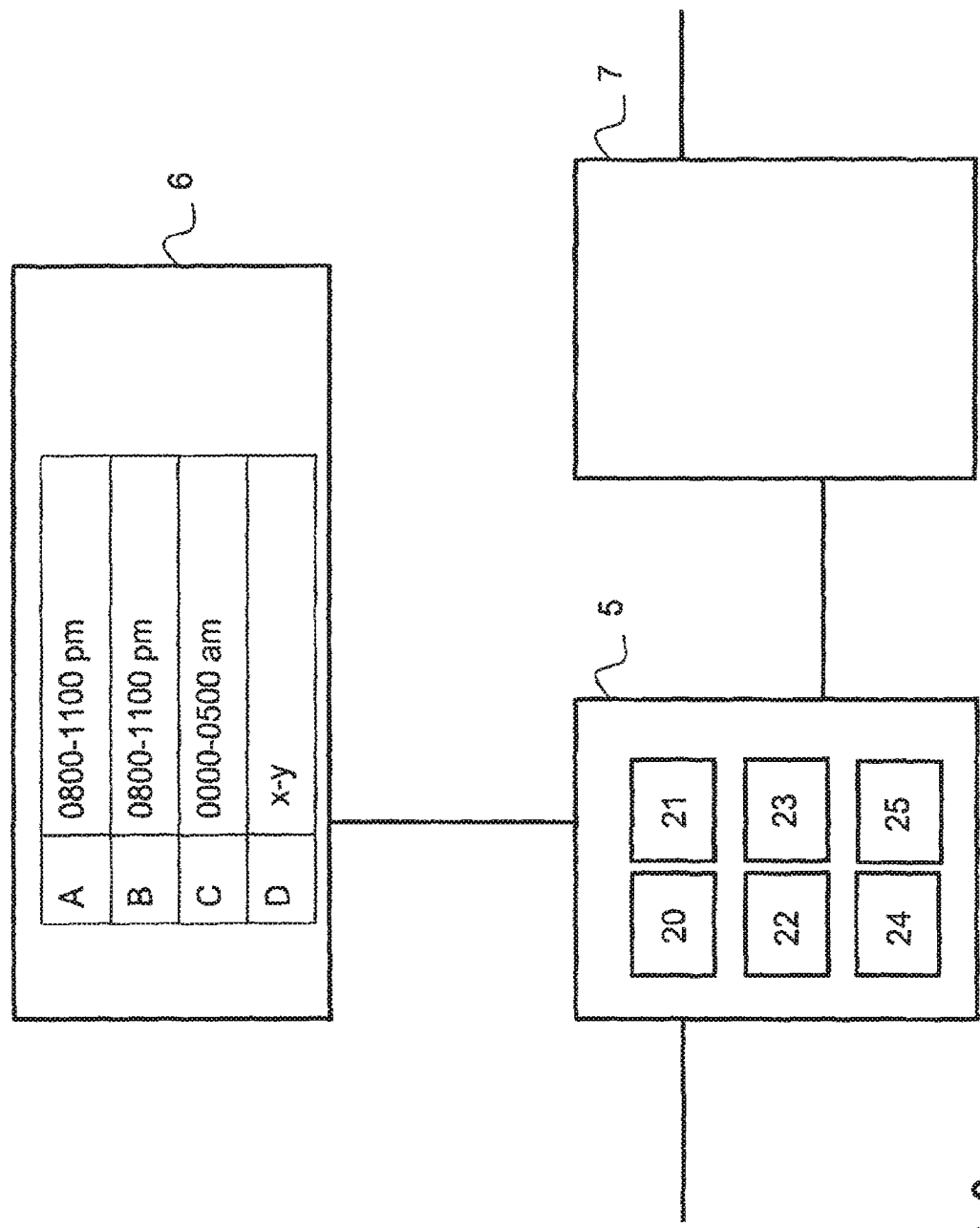
FIG. 2 shows a HLR, a SGSN and a GGSN of the telecommunications network of FIG. 1.

In particular, and with reference now to FIG. 2, the HLR 6 contains a unique identifier associated with the subscription for each terminal A-D, e.g. the IMSI stored in the SIM of the terminal A-D. Each terminal A-D has been assigned a time interval during which access to the telecommunications network 1 will be granted.

In this example, for terminals A and B, access will be granted between 0800-1100 pm. For terminal C, access will be granted between 0000-0500 am. These time intervals are typically off-peak intervals for most days of the year. Batches of terminals may be defined and assigned a particular interval of the off-peak hours. For terminal D, a variable time interval x-y is scheduled, depending on the network load experienced by or expected for the telecommunications network 1. If the network load drops below or is expected to drop below a particular threshold, access is granted to the terminal D.

Of course, the time intervals may also relate to time slots during which access to the telecommunications network 1 is denied, i.e. access deny time intervals. Multiple time intervals may be assigned to a terminal.

In order to control the use of resources of the telecommunications network 1, the SGSN 5 contains several modules for performing the operations described below in further detail. It should be noted that one or more of these modules may be implemented as software modules running on a processor (not shown). The SGSN 5 further contains memory and storage (not shown) for performing these operations in a manner generally known to the skilled person.

The SGSN 5 comprises an access request receiver 20 configured for receiving an access request from the terminals A-D for access to the telecommunications network 1. The access request of a terminal contains the IMSI of the SIM available in this terminal.

The SGSN 5 has an access module 21 configured for denying access for a terminal to the telecommunications network 1 if the access request is received outside the grant access time interval(s) for that terminal (or within the access deny interval). The access denial may relate to the network attach or the establishment of the PDP context.

Moreover, the SGSN 5 comprises a data retrieval module 22. The data retrieval module 22 is configured for retrieving data from the HLR 6, in particular the applicable access grant time interval associated with the terminals A-D from which the access request was received. However, it should be appreciated that the SGSN 5 itself may be pre-configured with respect to particular terminals and therefore already comprise the grant access time interval(s) for these terminals. This may be particularly advantageous for stationary terminals.

The SGSN 5 also comprises a PDP context establishing module 23 and an authenticator 24.

SGSN 5 may also have a network load monitor 25 configured for monitoring the network load of the telecommunications network 1. Network load information may also be obtained from other sources, e.g. other SGSNs or the HLR of the telecommunications network 1. Network monitoring may be real time and/or be based on the expected network load using mathematical models and history data to obtain an appropriate load expectation.

The operation of the telecommunications network 1, and in particular the SGSN 5, will now be described with reference to FIGS. 3A-3D.

Figure 3A:
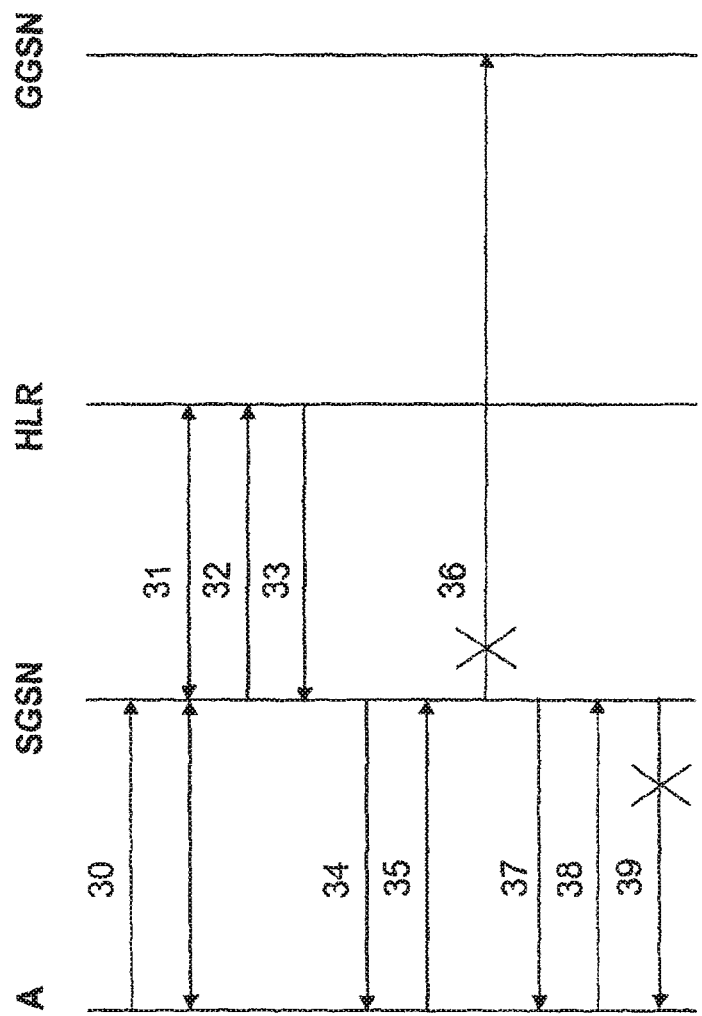
FIGS. 3A-3D show various time diagrams of methods for using the telecommunications system of FIG. 1.

In FIG. 3A, the access request receiver 20 of the SGSN 5 receives an attach request from terminal A at 0700 pm in step 30. To be able to process this attach request, the SGSN needs the IMSI of the SIM available in the terminal. The attach request may contain either this IMSI or a P-TMSI assigned to terminal A by an SGSN. The P-TMSI is used to prevent transmission of the IMSI over the radio path as much as possible for security reasons. If the P-TMSI provided by terminal A is known in the SGSN, the SGSN is able to derive the IMSI. Alternatively, for a P-TMSI provided by terminal A that is not known by the (new) SGSN, the IMSI is provided either by the old SGSN or the terminal itself on request of the new SGSN. The IMSI is used by data retrieval module 22 to retrieve the grant access time interval (0800-1100 pm) from the HLR 6 to the SGSN 5 in step 31.

The grant access time interval may be communicated from the HLR 6 to the SGSN 5 in a variety of ways.

The attach request 30 is typically followed by an authentication check, step 31. The grant access time interval may be transmitted to the SGSN 5 with the authentication triplet or quintet.

The authentication procedure of the network attach phase is typically followed by a location update procedure. First an update location request 32 is transmitted from the SGSN 5 to the HLR 6. The grant access time interval may also be transmitted to the SGSN 5 in a subsequent Insert Subscriber Data message from HLR 6 (step 33). The network attach phase is finalized with an attach accept message to the terminal A (step 34).

After finalizing the network attach phase (which may comprise further steps than mentioned in the previous paragraphs), a PDP context is established. The terminal A requests establishment of the PDP context in an activate PDP context request 35.

Irrespective of the manner of obtaining the grant access time interval, the access module of SGSN 5 determines that the access request was received outside the grant access time interval. Consequently, a PDP context is not established (indicated by the cross in step 36). The terminal A is informed of the denial in step 37.

It is noted that the authenticator 24 of SGSN 5 may or may not have authenticated terminal A in the above situation. Authentication is required if the grant access time interval is transmitted from the HLR 6 to SGSN 5 in response to the update location message 32. However, authentication should not be completed if the grant access time interval is obtained in SGSN with the authentication triplet/quintet. Authentication is preferred if the denial message 37 to the terminal A contains information concerning the grant access time interval.

The SGSN 5 comprises or obtains and maintains the data of the failed access request. This may e.g. be done by storing the time interval in combination with the IMSI of terminal A or by flagging the terminal A temporarily in combination with some time indication.

Another access request at a time outside the window 0800-1100 pm (step 38), again containing or followed by the IMSI of terminal A, may then be denied directly (step 39). Authentication will not be performed again.

Figure 3B:
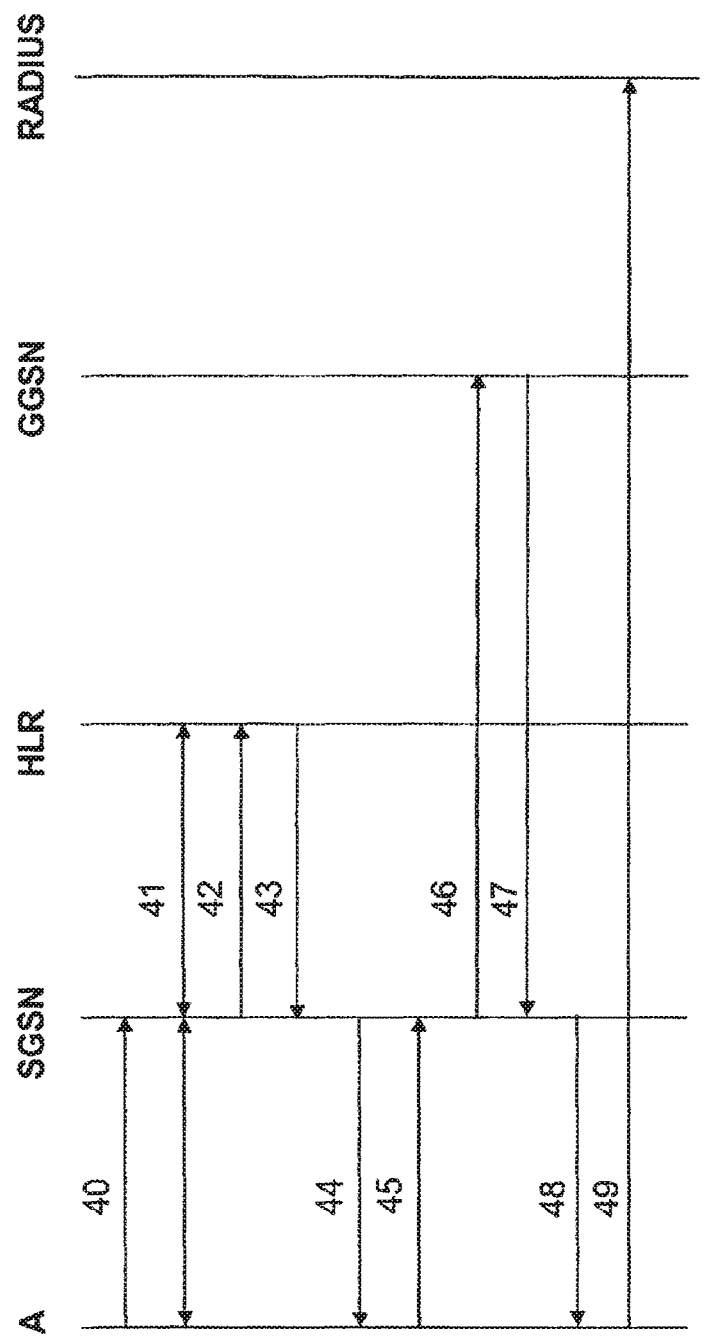

In FIG. 3B, the network attach of terminal A is received at 0900 pm. Steps 40-45 correspond to steps 30-35. Since the network attach request is now within the time interval allocated for access for the terminal A, access module 21 controls the PDP context establishing module 23 of the SGSN 5 to establish a PDP context with the terminal A and to establish a PDP tunnel with the GGSN 7. In particular, step 46 involves a Create PDP Context Request and step 47 a Create PDP Context Response in a manner known as such. In step 48, the terminal A is informed by a Activate PDP Context Accept message. The terminal A may now follow another authentication procedure (step 49), using e.g. a RADIUS server in the further network 8.

The network load monitoring module 25 of SGSN 5 may monitor the network load of (a part of) the telecommunications network 1 or output an expected network load. The network load may be compared with a load threshold in order to evaluate the existence of a low network load situation at a particular time or time interval.

Figure 3C:
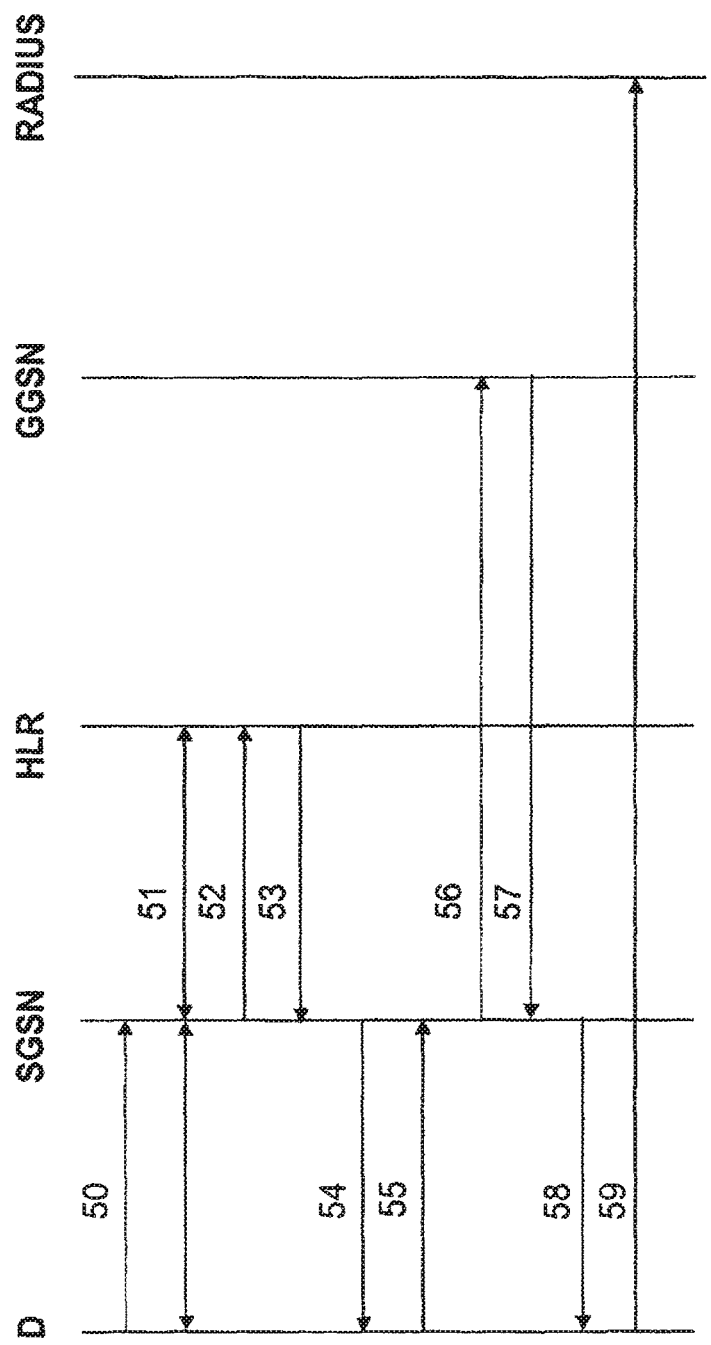

In FIG. 3C, steps 50-53 correspond to steps 30-33 of FIG. 3A. Authentication of terminal D is performed and in step 54, the terminal D is informed of a time interval x-y during which a low network load is expected. The information includes control information to control terminal D such that it accesses the telecommunications network 1 again (step 55) in such a low network load time interval. A PDP context can be set up immediately (steps 56-58) and access to the RADIUS server is allowed.

Figure 3D:
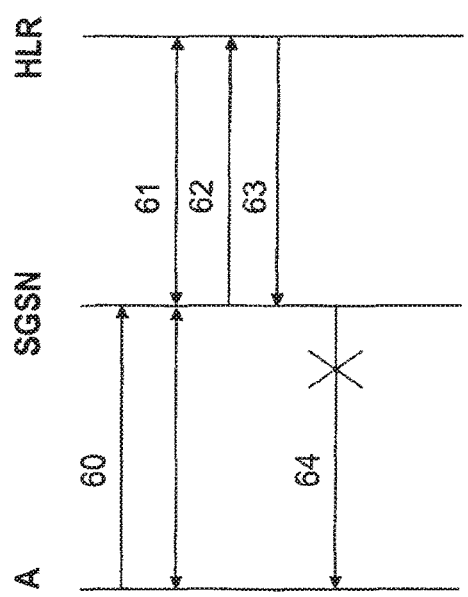

As mentioned above, the denial of access to the telecommunications network 1 is preferably performed during the network attach. FIG. 3D shows in step 60 a network attach message of terminal A containing an IMSI. Then an authentication procedure is performed (step 61) during which the grant access time interval is received at SGSN 5. The grant access time interval and the IMSI is stored at SGSN 5. Alternatively, the grant access time interval is obtained in the location update procedure (steps 62 and 63). The network attach is denied in step 64.

As mentioned before, SGSN 5 may itself comprise pre-configured information regarding the grant access time interval for terminal A. Alternatively, the SGSN uses authenticator 24 to authenticate terminal A and to provide terminal A with information regarding the grant access time interval in step 61.

Figure 4:
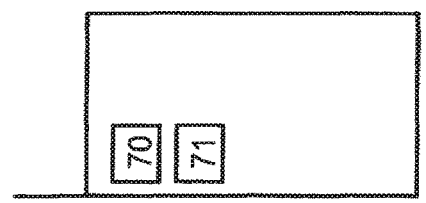
FIG. 4 shows a schematic illustration of a terminal for use with the telecommunications network of FIG. 1.

FIG. 4 shows a schematic illustration of terminal A. The terminal A comprises a transceiver module 70 for communicating with the telecommunications network 1. The terminal A further has an access request module 71. The access request module is configured for receiving information regarding the grant access time interval from the telecommunications network 1 via the transceiver module 70 and to transmit an access request to the telecommunications network only at a time within the grant access time interval.

It should be noted that the above described telecommunications network and system are especially suitable for saving resources. There may be other approaches to influence access behaviour of terminals but these are considered to waste more resources.

As an example, a network provider may allow access to the network at all times but charge a (very) high rate for data sent outside the off-peak time. This provides no incentive for the user to tear down the connection (i.e. the PDP context) to the network. It only provides an incentive to not send data during the expensive peak hour. However, an active PDP context still consumes a lot of resources in the mobile radio and core network as well as requiring an IP address. It also requires the terminal being attached to the network, meaning all kinds of mobility management features should be in place. Furthermore, this solution requires a more complicated billing system that allows charging higher rates at certain times.

Another example would include blocking access to the terminal during peak hours as a rule in a RADIUS server. However, network resources would already be consumed before access is blocked by the RADIUS server. The terminal is already allowed to attach to the network, meaning the SGSN would have retrieved information from the HLR, and is performing mobility management functions. Also, the terminal has been allowed to establish a PDP context. If the RADIUS server would reject the request for access to the external data network, the GGSN would not accept the PDP context, and the tunnel would be taken down. Attachment to the network will however continue if no additional measures were taken.

The invention claimed is:

1. A terminal configured for use in a telecommunications network, wherein the telecommunications network is configured for providing access to a plurality of terminals that each have a unique identifier for accessing the telecommunications network, wherein access to the telecommunications network for the terminal involves two or more access phases for establishing access, each phase involving one or more steps, and wherein the terminal comprises:
a message receiver configured for receiving a message from the telecommunications network, the message including access grant information indicative of at least one grant access time interval for the terminal, wherein the at least one grant access time interval specifies a time interval outside of which requesting network resources associated with at least one access phase of the two or more access phases for the terminal is not permitted, and wherein the at least one grant access time interval for the terminal is stored in a register of the telecommunications network in combination with the unique identifier of the terminal; and
one or more processors and memory storing processor instructions that, when executed by the one or more processors, cause the one or more processors to carry out operations including:
an access request operation for transmitting an access request for accessing resources associated with the at least one of the two or more access phases in accordance with the at least one grant access time interval included in the access grant information received from the telecommunications network, and
one or more applications of a class of applications that do not require immediate transfer of data,
wherein the grant access time interval for a terminal executing the one or more applications is a variable time interval x-y that is scheduled depending on a network load experienced by, or expected for, the telecommunications network, and the terminal executing the one or more applications transmits an access request for accessing the resources associated with the at least one of the two or more access phases to the telecommunications network in accordance with the variable time interval x-y specified in the access grant information received from the telecommunications network,
wherein the terminal executing the one or more applications that do not require immediate transfer of data is not permitted to request access to the resources associated with the at least one of the two or more access phases during peak load time intervals by having grant access time intervals that are outside the peak load time intervals.

2. The terminal as recited in claim 1, wherein a request for access to resources associated with the at least one access phase of the two or more access phases is granted if the network load is below, or is expected to be below, a particular threshold.

3. A terminal configured for use in a telecommunications network, wherein the telecommunications network is configured for providing access to a plurality of terminals that each have a unique identifier for accessing the telecommunications network, wherein access to the telecommunications network for the terminal involves two or more access phases for establishing access, each phase involving one or more steps,
and
wherein the terminal comprises:
a message receiver configured for receiving a message from the telecommunications network, the message including access denial information indicative of at least one deny access time interval for the terminal, wherein the at least one deny access time interval specifies a time interval within which requesting network resources associated with at least one access phase of the two or more access phases for the terminal is not permitted, and wherein the at least one deny access time interval for the terminal is stored in a register of the telecommunications network in combination with the unique identifier of the terminal; and
one or more processors and memory storing processor instructions that, when executed by the one or more processors, cause the one or more processors to carry out operations including:
an access request operation for transmitting an access request for accessing resources associated with the at least one of the two or more access phases in accordance with the at least one deny access time interval included in the access denial information received from the telecommunications network, and
one or more applications of a class of applications that do not require immediate transfer of data,
wherein the deny access time interval for a terminal executing the one or more applications is a variable time interval x-y that is scheduled depending on network load experienced by, or expected for, the telecommunications network, and the terminal executing the one or more applications transmits an access request for accessing the resources associated with the at least one of the two or more access phases to the telecommunications network in accordance with the variable time interval x-y specified in the access denial information received from the telecommunications network,
wherein the terminal executing the one or more applications that do not require immediate transfer of data is not permitted to request access to the resources associated with the at least one of the two or more phases access during peak load time intervals by having deny access time intervals that are within the peak load time intervals.

4. The terminal as recited in claim 3, wherein a request for access to resources associated with the at least one access phase of the two or more access phases is denied if the network load is above, or is expected to be above, a particular threshold.

5. A terminal configured for use in a telecommunications network, wherein the telecommunications network is configured for providing access to a plurality of terminals that each have a unique identifier for accessing the telecommunications network, wherein access to the telecommunications network for the terminal involves two or more access phases for establishing access, each phase involving one or more steps,
and
wherein the terminal comprises:
a message receiver configured for receiving a message from the telecommunications network, the message including access grant information indicative of at least one grant access time interval for the terminal, wherein the at least one grant access time interval specifies a time interval outside of which requesting network resources associated with at least one access phase of the two or more access phases for the terminal is not permitted, and wherein the at least one grant access time interval for the terminal is stored in a register of the telecommunications network in combination with the unique identifier of the terminal;
one or more processors; and
memory storing processor instructions that, when executed by the one or more processors, cause the one or more processors to carry out operations including:
an access request operation for transmitting an access request for accessing resources associated with the at least one of the two or more access phases in accordance with the at least one grant access time interval included in the access grant information received from the telecommunications network, and
one or more machine-to-machine applications,
wherein the grant access time interval for a terminal executing the machine-to-machine applications is a variable time interval x-y that is scheduled depending on network load experienced by, or expected for, the telecommunications network, and the terminal executing the one or more machine-to-machine applications transmits an access request for accessing the resources associated with the at least one of the two or more access phases to the telecommunications network in accordance with the variable time interval x-y specified in the access grant information received from the telecommunications network,
wherein the terminal executing the one or more machine-to-machine applications is not permitted to request access to the resources associated with the at least one of the two or more access phases during peak load time intervals by having grant access time intervals that are outside the peak load time intervals.

6. The terminal as recited in claim 5, wherein a request for access to resources associated with the at least one access phase of the two or more access phases is granted if the network load is below, or is expected to be below, a particular threshold.

7. A terminal configured for use in a telecommunications network, wherein the telecommunications network is configured for providing access to a plurality of terminals that each have a unique identifier for accessing the telecommunications network, wherein access to the telecommunications network for the terminal involves two or more access phases for establishing access, each phase involving one or more steps,
and
wherein the terminal comprises:
a message receiver configured for receiving a message from the telecommunications network, the message including access denial information indicative of at least one deny access time interval for the terminal, wherein the at least one deny access time interval specifies a time interval within which requesting network resources associated with at least one access phase of the two or more access phases for the terminal is not permitted, and wherein the at least one deny access time interval for the terminal is stored in a register of the telecommunications network in combination with the unique identifier of the terminal;
one or more processors; and memory storing processor instructions that, when executed by the one or more processors, cause the one or more processors to carry out operations including:

an access request operation for transmitting an access request for accessing resources associated with the at least one of the two or more access phases in accordance with the at least one deny access time interval included in the access denial information received from the telecommunications network, and one or more machine-to-machine applications, wherein the deny access time interval for a terminal executing the machine-to-machine applications is a variable time interval x-y that is scheduled depending on network load experienced by, or expected for, the telecommunications network, and the terminal executing the one or more machine-to-machine applications transmits an access request for accessing the resources associated with the at least one of the two or more access phases to the telecommunications network in accordance with the variable time interval x-y specified in the access denial information received from the telecommunications network, wherein the terminal executing the one or more machine-to-machine applications is not permitted to request access to the resources associated with the at least one of the two or more access phases within peak load time intervals by having deny access time intervals that are during the peak load time intervals.

8. The terminal as recited in claim 7, wherein a request for access to resources associated with the at least one access phase of the two or more access phases is denied if the network load is above, or is expected to be above, a particular threshold.

* * * * *

(12) EX PARTE REEXAMINATION CERTIFICATE (13093rd)
United States Patent
Van Loon et al.

(10) Number: US 10,187,904 C1
(45) Certificate Issued: Nov. 24, 2025

(54) TELECOMMUNICATIONS NETWORK AND METHOD FOR TIME-BASED NETWORK ACCESS

(71) Applicant: Koninklijke KPN N.V., The Hague (NL)

(72) Inventors: Johannes Maria Van Loon, Zoetermeer (NL); Michael Robert Schenk, The Hague (NL)

(73) Assignee: Koninklijke KPN N.V.

Reexamination Request:
No. 90/019,934, Apr. 29, 2025

Reexamination Certificate for:
Patent No.: 10,187,904
Issued: Jan. 22, 2019
Appl. No.: 15/056,500
Filed: Feb. 29, 2016

Related U.S. Application Data

(63) Continuation of application No. 14/297,767, filed on Jun. 6, 2014, now Pat. No. 9,781,743, which is a continuation of application No. 12/919,965, filed as application No. PCT/EP2009/001214 on Feb. 19, 2009, now Pat. No. 9,014,667.

(51) Int. Cl.
| | | |
|---|---|---|
| H04W 4/00 | (2018.01) |
| H04M 3/38 | (2006.01) |
| H04W 4/50 | (2018.01) |
| H04W 4/70 | (2018.01) |
| H04W 8/26 | (2009.01) |
| H04W 12/06 | (2021.01) |
| H04W 28/02 | (2009.01) |
| H04W 48/08 | (2009.01) |
| H04W 60/00 | (2009.01) |
| H04W 74/00 | (2009.01) |
| H04W 74/04 | (2009.01) |
| H04W 76/11 | (2018.01) |
| H04W 12/61 | (2021.01) |
| H04W 12/72 | (2021.01) |

(52) U.S. Cl.
CPC .............. *H04W 74/04* (2013.01); *H04M 3/38* (2013.01); *H04W 4/50* (2018.02); *H04W 4/70* (2018.02); *H04W 28/0247* (2013.01); *H04W 48/08* (2013.01); *H04W 74/002* (2013.01); *H04W 76/11* (2018.02); *H04W 8/26* (2013.01); *H04W 12/06* (2013.01); *H04W 12/61* (2021.01); *H04W 12/72* (2021.01); *H04W 60/00* (2013.01); *H04W 74/00* (2013.01)

(58) Field of Classification Search
None
See application file for complete search history.

(56) References Cited

To view the complete listing of prior art documents cited during the proceeding for Reexamination Control Number 90/019,934, please refer to the USPTO's Patent Electronic System.

*Primary Examiner* — Ovidio Escalante

(57) ABSTRACT

The invention relates to a telecommunications network configured for providing access to a plurality of terminals is proposed and a method therefore. Each terminal comprises a unique identifier for accessing the telecommunications network. The telecommunications network comprises a register, an access request receiver and an access module. The register is configured for storing the unique identifier of at least one terminal in combination with at least one grant access time interval, or an equivalent thereof, during which access for the terminal is permitted. The access request receiver is configured for receiving the access request and the unique identifier for accessing the telecommunications network from the terminal. The access module is configured for denying access for the terminal if the access request is received outside the time interval, or the equivalent thereof.

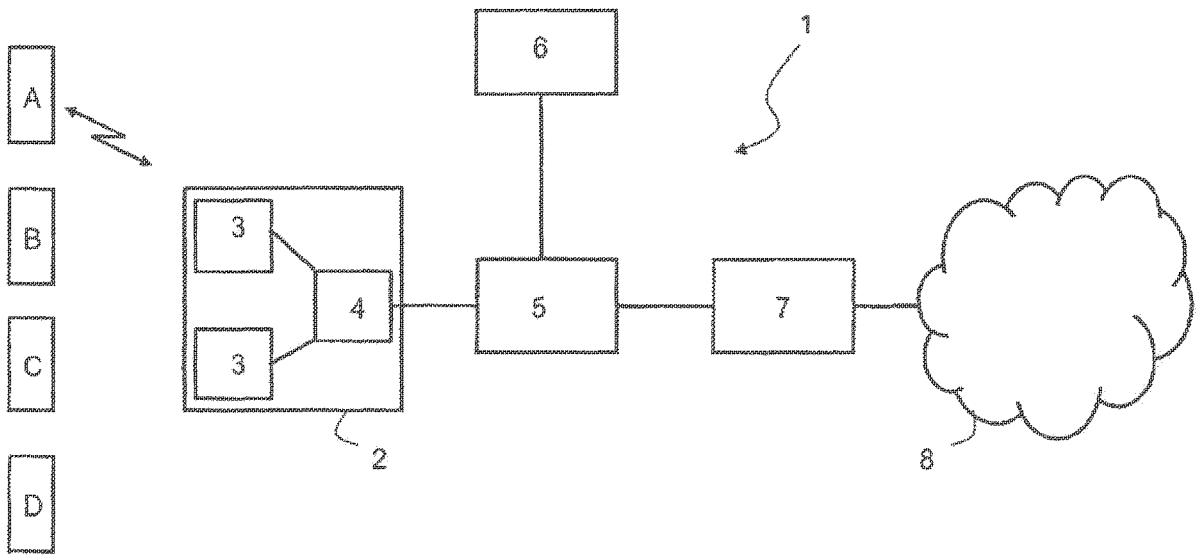

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 7 are cancelled.

Claims 3 and 5 are determined to be patentable as amended.

Claims 4 and 6, dependent on an amended claim, are determined to be patentable.

New claims 9-24 are added and determined to be patentable.

Claims 2 and 8 were not reexamined.

3. A terminal configured for use in a telecommunications network, wherein the telecommunications network is configured for providing access to a plurality of terminals that each have a unique identifier for accessing the telecommunications network, wherein access to the telecommunications network for the terminal involves two or more access phases for establishing access, each phase involving one or more steps, *the two or more access phases comprising a first access phase being for network attach and a second access phase being for establishing a PDP context,* and wherein the terminal comprises:

a message receiver configured for receiving a message from the telecommunications network, the message including access denial information indicative of at least one deny access time interval for the terminal, wherein the at least one deny access time interval specifies a time interval within which requesting network resources associated with at least one access phase of the two or more access phases for the terminal is not permitted, and wherein the at least one deny access time interval for the terminal is stored in a register of the telecommunications network in combination with the unique identifier of the terminal; and one or more processors and memory storing processor instructions that, when executed by the one or more processors, cause the one or more processors to carry out operations including:

*a first access request operation for transmitting a request for network attach;*

*a request response operation for receiving a request response to the first access request operation request for network attach, the request response denying network attach based on telecommunications network load, the request response including the at least one deny access time interval;*

[an] *a second* access request operation for transmitting an access request for accessing resources associated with the at least one of the two or more access phases in accordance with the at least one deny access time interval included in the access denial information received from the telecommunications network, and one or more applications of a class of applications that do not require immediate transfer of data, wherein the deny access time interval for a terminal executing the one or more applications is a variable time interval x-y that is scheduled depending on network load experienced by, or expected for, the telecommunications network, and the terminal executing the one or more applications transmits an access request for accessing the resources associated with the at least one of the two or more access phases to the telecommunications network in accordance with the variable time interval x-y specified in the access denial information received from the telecommunications network, *and* wherein the terminal executing the one or more applications that do not require immediate transfer of data is not permitted to request access to the resources associated with the at least one of the two or more *access phases* [access] during peak load time intervals by having deny access time intervals that are within the peak load time intervals.

5. A terminal configured for use in a telecommunications network, wherein the telecommunications network is configured for providing access to a plurality of terminals that each have a unique identifier for accessing the telecommunications network, wherein access to the telecommunications network for the terminal involves two or more access phases for establishing access, each phase involving one or more steps, *the two or more access phases comprising a first access phase being for network attach and a second access phase being for establishing a PDP context,* and wherein the terminal comprises:

a message receiver configured for receiving a message from the telecommunications network, the message including access grant information indicative of at least one grant access time interval for the terminal, wherein the at least one grant access time interval specifies a time interval outside of which requesting network resources associated with at least one access phase of the two or more access phases for the terminal is not permitted, and wherein the at least one grant access time interval for the terminal is stored in a register of the telecommunications network in combination with the unique identifier of the terminal;

one or more processors; and memory storing processor instructions that, when executed by the one or more processors, cause the one or more processors to carry out operations including:

*a first access request operation for transmitting a request for network attach;*

*a request response operation for receiving a request response to the first access request operation request for network attach, the request response denying network attach based on telecommunications network load, the request response including the at least one grant access time interval;*

[an] *a second* access request operation for transmitting an access request for accessing resources associated with the at least one of the two or more access phases in accordance with the at least one grant access time interval included in the access grant information received from the telecommunications network, and one or more machine-to-machine applications, wherein the grant access time interval for a terminal executing the machine-to-machine applications is a variable time interval x-y that is scheduled depending on network load experienced by, or expected for, the telecommunications network, and the terminal executing the one or more machine-to-machine applications transmits an access request for accessing the resources associated with the at least one of the two or more access phases to the telecommunications network in accordance with the variable time interval x-y specified in the access grant information received from the telecommunications network, *and* wherein the terminal executing the one or more machine-to-machine applications is not permitted to request access to the resources associated with the at least one of the two or more access phases during peak load time intervals by having grant access time intervals that are outside the peak load time intervals.

9. The terminal as recited in claim 1, wherein the two or more access phases comprise a first access phase being for network attach and a second access phase being for establishing a PDP context, and wherein the memory storing processor instructions that, when executed by the one or more processors, cause the one or more processors to carry out operations including:

an additional access request operation for transmitting a request for network attach; and a request response operation for receiving a request response to the additional access request operation request for network attach, the request response denying network attach based on telecommunications network load, the request response including the at least one grant access time interval.

10. The terminal as recited in claim 9, wherein a request for access to resources associated with the at least one access phase of the two or more access phases is granted if the network load is below, or is expected to be below, a particular threshold.

11. The terminal as recited in claim 9, wherein the at least one grant access time interval specifies a time interval outside of which requesting a network attach is not permitted.

12. The terminal as recited in claim 9, wherein the at least one grant access time interval specifies a time interval outside of which requesting a PDP context is not permitted.

13. The terminal as recited in claim 9, wherein the first access phase includes steps of requesting network attachment, authentication and request response, and wherein the memory storing processor instructions that, when executed by the one or more processors, cause the one or more processors to carry out operations including:

a second additional access request operation for transmitting a request for network attach, the second additional access request operation occurring after the additional access request operation and after the request response operation receiving the request response denying network attach based on telecommunications network load; and a second request response operation for receiving a second request response to the second additional access request operation request for network attach, the second request response denying network attach based on telecommunications network load, the second request response occurring without the terminal performing the authentication step for the second additional access request operation.

14. The terminal as recited in claim 3, wherein the at least one deny access time interval specifies a time interval within which requesting a network attach is not permitted.

15. The terminal as recited in claim 3, wherein the at least one deny access time interval specifies a time interval within which requesting a PDP context is not permitted.

16. The terminal as recited in claim 3, wherein the first access phase includes steps of requesting network attachment, authentication and request response, and wherein the memory storing processor instructions that, when executed by the one or more processors, cause the one or more processors to carry out operations including:

a third access request operation for transmitting a request for network attach, the third access request operation occurring after the first access request operation and after the request response operation receiving the request response denying network attach based on telecommunications network load; and a second request response operation for receiving a second request response to the third access request operation request for network attach, the second request response denying network attach based on telecommunications network load, the second request response occurring without the terminal performing the authentication step for the third access request operation.

17. The terminal as recited in claim 5, wherein the at least one grant access time interval specifies a time interval outside of which requesting a network attach is not permitted.

18. The terminal as recited in claim 5, wherein the at least one grant access time interval specifies a time interval outside of which requesting a PDP context is not permitted.

19. The terminal as recited in claim 5, wherein the first access phase includes steps of requesting network attachment, authentication and request response, and wherein the memory storing processor instructions that, when executed by the one or more processors, cause the one or more processors to carry out operations including:

a third access request operation for transmitting a request for network attach, the third access request operation occurring after the first access request operation and after the request response operation receiving the request response denying network attach based on telecommunications network load; and a second request response operation for receiving a second request response to the third access request operation request for network attach, the second request response denying network attach based on telecommunications network load, the second request response occurring without the terminal performing the authentication step for the third access request operation.

20. The terminal as recited in claim 7, wherein the two or more access phases comprising a first access phase being for network attach and a second access phase being for establishing a PDP context, and wherein the memory storing processor instructions that, when executed by the one or more processors, cause the one or more processors to carry out operations including:

an additional access request operation for transmitting a request for network attach; and a request response operation for receiving a request response to the additional access request operation request for network attach, the request response denying network attach based on telecommunications network load, the request response including the at least one deny access time interval.

21. The terminal as recited in claim 20, wherein a request for access to resources associated with the at least one access phase of the two or more access phases is denied if the network load is above, or is expected to be above, a particular threshold.

22. The terminal as recited in claim 20, wherein the at least one deny access time interval specifies a time interval within which requesting a network attach is not permitted.

23. The terminal as recited in claim 20, wherein the at least one deny access time interval specifies a time interval within which requesting a PDP context is not permitted.

24. The terminal as recited in claim 20, wherein the first access phase includes steps of requesting network attachment, authentication and request response, and
  wherein the memory storing processor instructions that, when executed by the one or more processors, cause the one or more processors to carry out operations including:

a second additional access request operation for transmitting a request for network attach, the second additional access request operation occurring after the additional access request operation and after the request response operation receiving the request response denying network attach based on telecommunications network load; and a second request response operation for receiving a second request response to the second additional access request operation request for network attach, the second request response denying network attach based on telecommunications network load, the second request response occurring without the terminal performing the authentication step for the second additional access request operation.

\* \* \* \* \*